(12) United States Patent
Fukao et al.

(10) Patent No.: US 7,136,523 B2
(45) Date of Patent: Nov. 14, 2006

(54) COLOR CORRECTION TABLE FORMING METHOD AND APPARATUS, CONTROL PROGRAM AND STORAGE MEDIUM

(75) Inventors: Suzuko Fukao, Tokyo (JP); Shigeyasu Nagoshi, Kanagawa (JP); Okinori Tsuchiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/260,558

(22) Filed: Oct. 1, 2002

(65) Prior Publication Data

US 2003/0081831 A1 May 1, 2003

(30) Foreign Application Priority Data

| Oct. 4, 2001 | (JP) | ............................. 2001-308643 |
| Oct. 4, 2001 | (JP) | ............................. 2001-308644 |
| Sep. 26, 2002 | (JP) | ............................. 2002-281377 |

(51) Int. Cl.
*G06K 9/00* (2006.01)
*G06K 9/40* (2006.01)

(52) U.S. Cl. ...................................... 382/167; 382/264
(58) Field of Classification Search ...................... None
See application file for complete search history.

(56) References Cited

U.S. PATENT DOCUMENTS

| 4,929,978 A | * | 5/1990 | Kanamori et al. ............. 355/38 |
| 5,619,427 A | * | 4/1997 | Ohkubo ....................... 358/523 |
| 5,781,206 A | * | 7/1998 | Edge ............................ 347/19 |
| 5,902,052 A | * | 5/1999 | Hayashi ................. 400/120.02 |
| 6,269,184 B1 | * | 7/2001 | Spaulding et al. ........... 382/167 |
| 6,724,507 B1 | * | 4/2004 | Ikegami et al. ............. 358/518 |
| 2002/0048031 A1 | * | 4/2002 | Suwa et al. .................. 358/1.9 |
| 2002/0126302 A1 | | 9/2002 | Fukao ........................ 358/1.9 |
| 2003/0025759 A1 | | 2/2003 | Nagoshi et al. ............... 347/43 |

FOREIGN PATENT DOCUMENTS

| EP | 0 611 230 | 8/1994 |
| EP | 0 611 231 | 8/1994 |
| EP | 0611231 A1 * | 8/1994 |
| EP | 0 674 430 | 9/1995 |
| EP | 0674430 A1 * | 9/1995 |
| EP | 0 679 020 | 10/1995 |
| JP | 1991-013066 | 1/1991 |
| JP | 2001-16476 | 1/2001 |

* cited by examiner

*Primary Examiner*—Wenpeng Chen
(74) *Attorney, Agent, or Firm*—Fitzpatrick, Cella, Harper & Scinto

(57) ABSTRACT

It aims to improve color reproducibility by enabling to control a smoothing condition for each of plural positions on color space. When a color correction table is formed by using smoothing, the smoothing conditions respectively corresponding to the plural positions on the color space are set, and then the smoothing is performed according to the smoothing conditions.

14 Claims, 30 Drawing Sheets

FIG. 3

| STEPS OF R VALUE : 0,43,85...,212,255 |
|---|
| STEPS OF G VALUE : 0,43,85...,212,255 |
| STEPS OF B VALUE : 0,43,85...,212,255 |
| POST-CORRECTION RGB VALUES OF GRID (0,0,0) : (0,0,0)<br>POST-CORRECTION RGB VALUES OF GRID (0,0,1) : (0,3,45)<br>⋮<br>POST-CORRECTION RGB VALUES OF GRID (0,0,6) : (2,10,253)<br>POST-CORRECTION RGB VALUES OF GRID (0,1,0) : (2,254,55)<br>⋮<br>POST-CORRECTION RGB VALUES OF GRID (6,6,5) : (253,255,220)<br>POST-CORRECTION RGB VALUES OF GRID (6,6,6) : (255,255,255) |

FIG. 6

DESIGNATE VARIATION (ΔE) LIMITING VALUE OF SMOOTHING

| | |
|---|---|
| R | 1.5 |
| G | 0 |
| B | 1.2 |
| C | 1.0 |
| M | 0 |
| Y | 0.5 |

FIG. 7

VARIATION LIMITING VALUE (ΔE) OF GRID (0,0,0) : 0
VARIATION LIMITING VALUE (ΔE) OF GRID (0,0,1) : 1.5
.
.
VARIATION LIMITING VALUE (ΔE) OF GRID (0,0,6) : 1.5
VARIATION LIMITING VALUE (ΔE) OF GRID (0,1,0) : 0.8
.
.
VARIATION LIMITING VALUE (ΔE) OF GRID (6,6,5) : 0.1
VARIATION LIMITING VALUE (ΔE) OF GRID (6,6,6) : 0

| DESIGNATE VARIATION (ΔE) LIMITING VALUE OF SMOOTHING | | | |
|---|---|---|---|
| W-R | 1.5 | R-Bk | 1.5 |
| W-G | 0 | G-Bk | 0 |
| W-B | 1.2 | B-Bk | 1.2 |
| W-C | 1.0 | C-Bk | 1.0 |
| W-M | 0 | M-Bk | 0 |
| W-Y | 0.5 | Y-Bk | 0.5 |

SELECT SMOOTHING AMOUNT CORRECTION TARGET COLOR

2401 — CORRECTION TARGET RGB VALUES

R  30
G  100
B  122

2402 — VARIATION LIMITING VALUE

ΔE  1.0

2403 — INFLUENTIAL RANGE

ΔRGB  30

☐ DESIGNATE RGB VALUES FROM IMAGE

2404

| COLOR AREA | CONDITION | ΔR | ΔY | ΔG | ΔC | ΔB | ΔM |
|---|---|---|---|---|---|---|---|
| 1 | R>G>B | R-G | G-B | 0 | 0 | 0 | 0 |
| 2 | G>R>B | 0 | R-B | G-R | 0 | 0 | 0 |
| 3 | G>B>R | 0 | 0 | G-B | B-R | 0 | 0 |
| 4 | B>G>R | 0 | 0 | 0 | G-R | B-G | 0 |
| 5 | B>R>G | 0 | 0 | 0 | 0 | B-R | R-G |
| 6 | R>B>G | R-B | 0 | 0 | 0 | 0 | B-G |

COLOR CORRECTION TABLE FORMING METHOD AND APPARATUS, CONTROL PROGRAM AND STORAGE MEDIUM

BACKGROUND OF THE INVENTION

1. Field of the Invention

The present invention relates to a color correction table forming method, a color correction table forming apparatus, a control program for controlling the color correction table forming method and apparatus, and a storage medium storing the control program.

2. Related Background Art

Generally, in a computer system or the like, when an image displayed on a monitor is printed and output by a printer, since a color reproduction range of the monitor is remarkably different from that of the printer, a so-called color matching process is necessary to adjust a monitor-displayed color and a printed color so that appearances of these colors become equivalent to each other. As the color matching process, for example, a color correction process to perform an interpolation operation by referring to a color correction look-up table (hereinafter, called a "color correction table") taking into consideration color characteristics of the monitor and the printer is known.

However, in a process to form the color correction table, various noise can arise and come to be mixed in the values of the formed color correction table. For example, when a colorimetry process is generally performed in order to learn the actual characteristics of the printer, a colorimetry error in this process might cause noise. In addition, a quantization error or the like in a case of quantizing the result of a calculation process might cause such noise. Thus, if noise which has occurred due to such a cause as these comes to be mixed into the values of the color correction table, the change of the values of the table becomes unsmooth. As a result, a tone change (or a gradation change) becomes unsmooth in the image after the color correction is performed, and thus a problem of a pseudo-contour or the like easily arises when the color-corrected image is printed by the printer.

Therefore, in order to eliminate the noise in the color correction table, a smoothing process using a shift unchanged filter is conventionally performed on the values of the color correction table.

However, if the same smoothing process is performed on all the values of the color correction table as in such a conventional technique, the value in the area where the smoothing is not as necessary as elsewhere changes unintendedly from the value it had before smoothing. As an example of an area where smoothing is not so necessary in a color correction table, is an area where it is considered that the value has already changed smoothly before the smoothing process is performed, or an area where it is intended to suppress a change of the value due to the smoothing process for colorimetric reasons or reasons of subjective judgment. Moreover, if it is considered, based on the image printed by the printer, that it is desirable preponderantly to perform the smoothing process only on a specific area on color space, it is conventionally difficult to achieve the smoothing process only for this area. Thus, the smoothness by the smoothing process can-not be changed for each area, whereby it is impossible to form the color correction table for obtaining an image having the desired satisfactory quality for a user.

Moreover, in image equipment such as an ink-jet printer or the like, in a case where R (red), G (green) and B (blue) signals input from an image input unit are converted into device colors (e.g., C (cyan), M (magenta), Y (yellow) and K (black)) of the image equipment and a color image is then output from an image output unit, color reproducibility should be satisfactorily maintained. As a technique to achieve this, a method of performing former-stage color conversion (i.e., color correction) and a latter-stage color conversion (i.e., color separation) by using a three-dimensional LUT (look-up table) is known.

In the former-stage color conversion, so-called color reproduction space mapping is used to compress the range incapable of being color-reproduced by the image output unit and map the compressed range into the range capable of being color-reproduced by the image output unit.

Conventionally, the following technique to perform the color reproduction space mapping technique is known. That is, in a case of performing the color conversion by using the three-dimensional LUT and then performing the color reproduction space mapping (i.e., color area conversion), an output color space (i.e., a space formed by color signals between a color reproduction conversion system and an output system) is divided into an area on which the color reproduction space mapping process is performed and an area on which the color reproduction space mapping process is not performed, the corresponding area is mapped to an input color space (i.e., a space formed by color signals between an input system and the color reproduction conversion system), a and clipping area is discriminated based on the mapped area, thus completing the color reproduction space mapping.

In the latter-stage color conversion, a so-called color separation process is performed to convert the R, G and B signals input from the image input unit into the device colors of the printer.

Incidentally, in the above color conversion method using the LUT, it is often the case that the respective values at lattice points on the LUT are calculated independently, and thus there is no continuity between the values of the adjacent lattice points, whereby discontinuity in regard to the signal values might arise on the LUT. For example, in Japanese Patent Application Laid-Open No. 2001-16476, smoothing by using a three-dimensional filter is performed on R, G and B channels independently in order to eliminate discontinuity. Moreover, in order to prevent gray from becoming a chromatic color as a result of the smoothing process, the area to be processed is divided into a gray area and a chromatic color area, and the smoothing process is performed on the gray area with the constraint of maintaining the relation R=G=B.

However, if the above conventional smoothing process is applied to the former-stage color conversion, the smoothing is performed uniformly on the entire color space other than the gray area(s), and on the gray area(s). Thus, for example, it is impossible to effect precision effects such as locally not performing the smoothing (or performing it in a particular way locally) on a specific chromatic color so that for example a color around a skin color is preserved in the smoothing, and as a result it is necessary to perform an adjustment which considers a color change due to the smoothing before the color adjustment is actually performed. Therefore, there is a problem that it is difficult for the user to perform the color adjustment as a whole.

Moreover, if the above conventional smoothing process is applied to the former-stage color conversion, the processing of the gray area is entirely performed independently of that of the chromatic color area. Therefore, there can occur a problem that a color change is discontinuous between a gray line and an achromatic color in the vicinity of the gray line.

Moreover, if the above conventional smoothing process is applied to one or both of the former-stage color conversion and the latter-stage color conversion, there is a problem that a predetermined value can-not be preserved in the smoothing in a portion which is different from noise that is the target of the smoothing in the vicinity of, e.g., a solid color portion (satisfying the maximum saturation or the maximum density for each color) in the former stage or the latter stage (e.g., the portion which is the peak of a color signal change).

SUMMARY OF THE INVENTION

The present invention is achieved to solve the above problems, and an object thereof is to improve color reproducibility by enabling control of a smoothing condition for each of plural positions on color space.

Moreover, the present invention is achieved in consideration of the above problems, and an object thereof is locally not to perform smoothing or locally is to perform smoothing (only on a specific color of an achromatic color).

Another object of the present invention is to prevent a color change being discontinuous between a gray line and an achromatic color in the vicinity of the gray line.

Still another object of the present invention is to enable selectable smoothing only of noise that is the target of smoothing while maintaining a portion which is the peak of a color signal change through the smoothing.

In order to achieve the above objects, the present invention is characterized, as one means, by a color correction table forming method of forming a color correction table by performing smoothing, comprising the steps of: setting smoothing conditions respectively corresponding to plural positions on color space; and performing the smoothing according to the set smoothing conditions.

Moreover, the present invention is characterized in that a second look-up table is formed by using a first look-up table and a look-up table after smoothing obtained by performing the smoothing to the first look-up table. Moreover, the present invention is characterized in that the smoothing is performed in accordance with parameters to control the smoothing. Moreover, the present invention is characterized in that the smoothing is performed in accordance with smoothing intensity for each hue. Moreover, the present invention is characterized in that the second look-up table is formed by a weighted average of the look-up table after the smoothing and the first look-up table.

Other object of the present invention will be apparent from the following embodiments.

BRIEF DESCRIPTION OF THE DRAWINGS

FIG. 3 is a diagram showing an example of data held in a color correction table;

FIG. 6 is a diagram showing an example of a UI (user interface) used to designate smoothing parameters;

FIG. 7 is a diagram showing an example of data held in a variation limiting value table;

DETAILED DESCRIPTION OF THE PREFERRED EMBODIMENTS

Hereinafter, the preferred embodiments of the present invention will now be explained with reference to the attached drawings.

First Embodiment

Figure 1:
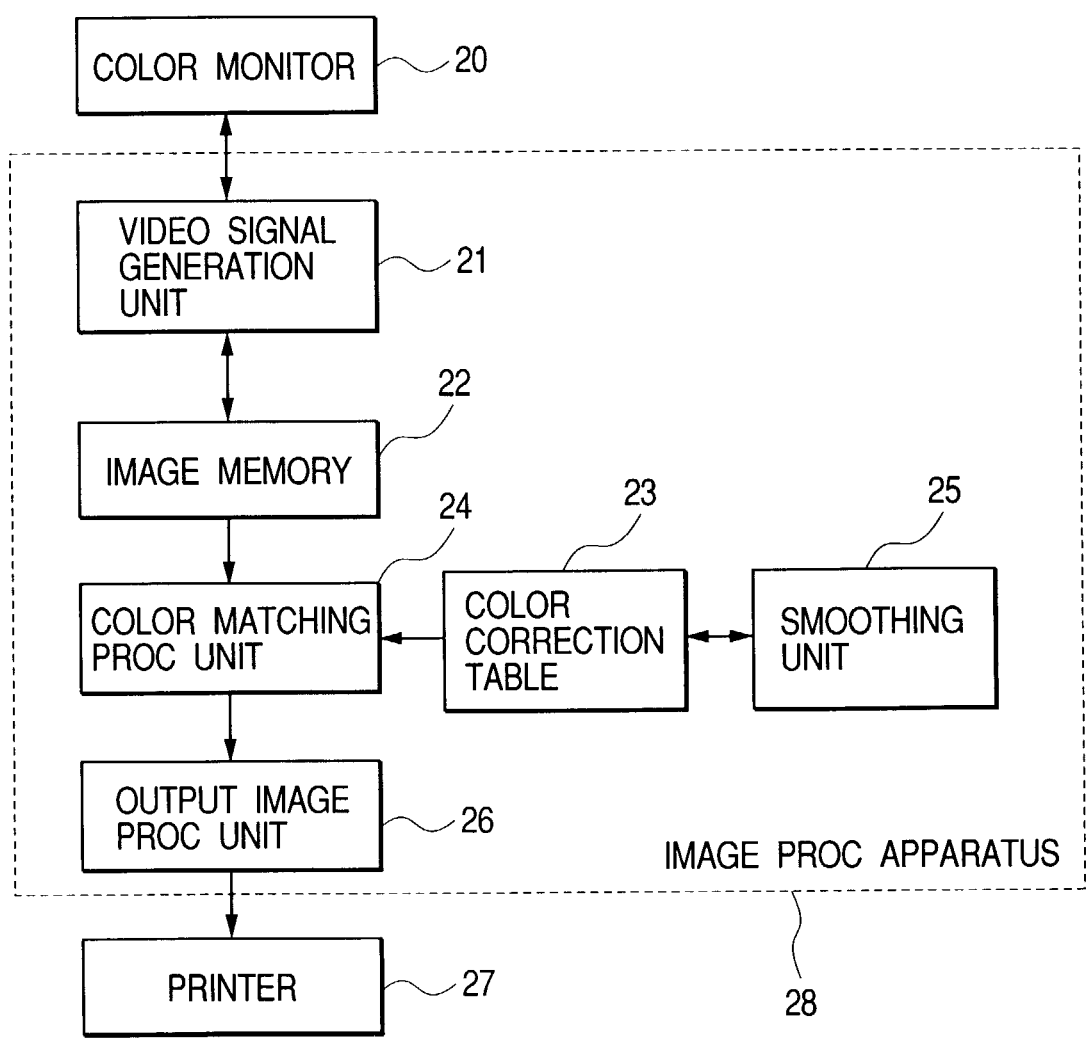
FIG. 1 is a block diagram showing the structure of an image processing apparatus to which a color adjustment device according to one preferred embodiment is applied.

FIG. 1 is a block diagram showing the structure of an image processing apparatus to which a color adjustment device according to the first embodiment is applied, and shows both a color monitor 20 for displaying an image and a printer for printing the image on a recording medium connected to an image processing apparatus 28. The image processing apparatus 28 is composed of a video signal generation unit 21 for converting image data into a video signal, an image memory 22 for storing the image data, a color correction table 23 for storing the correspondence between monitor display colors and print colors, a color matching processing unit 24 for performing color matching between the monitor display color and the print color by referring to the color correction table 23, a smoothing unit 25 for smoothing the data stored in the color correction table 23, and an output image processing unit 26 for converting the image data into a printer driving signal.

In the present embodiment, it should be noted that the image data (target image data) to be processed includes data digitized by an image input device such as a digital camera, a scanner or the like, and data generated through computer graphics (CG). Here, it is assumed that the image data is stored beforehand in the image memory 22 as a pixel value corresponding to lightness: more specifically, each pixel value has R, G and B data stored as eight-bit values.

In the present embodiment, it is assumed that the color monitor 20 is a display such as a CRT (cathode ray tube) or an LCD (liquid crystal display), and that the printer 27 is an ink-jet printer for discharging and fixing ink droplets of C, M, Y and K onto an output sheet and thus representing a shade of color by the density of the discharged ink droplets. Here, it should be noted that the color monitor 20 and the printer 27 are not limited to these examples, however. For example, the printer 27 may be an other-system printer such as an electrophotographic printer, a thermal-transfer printer or the like.

Figure 2:
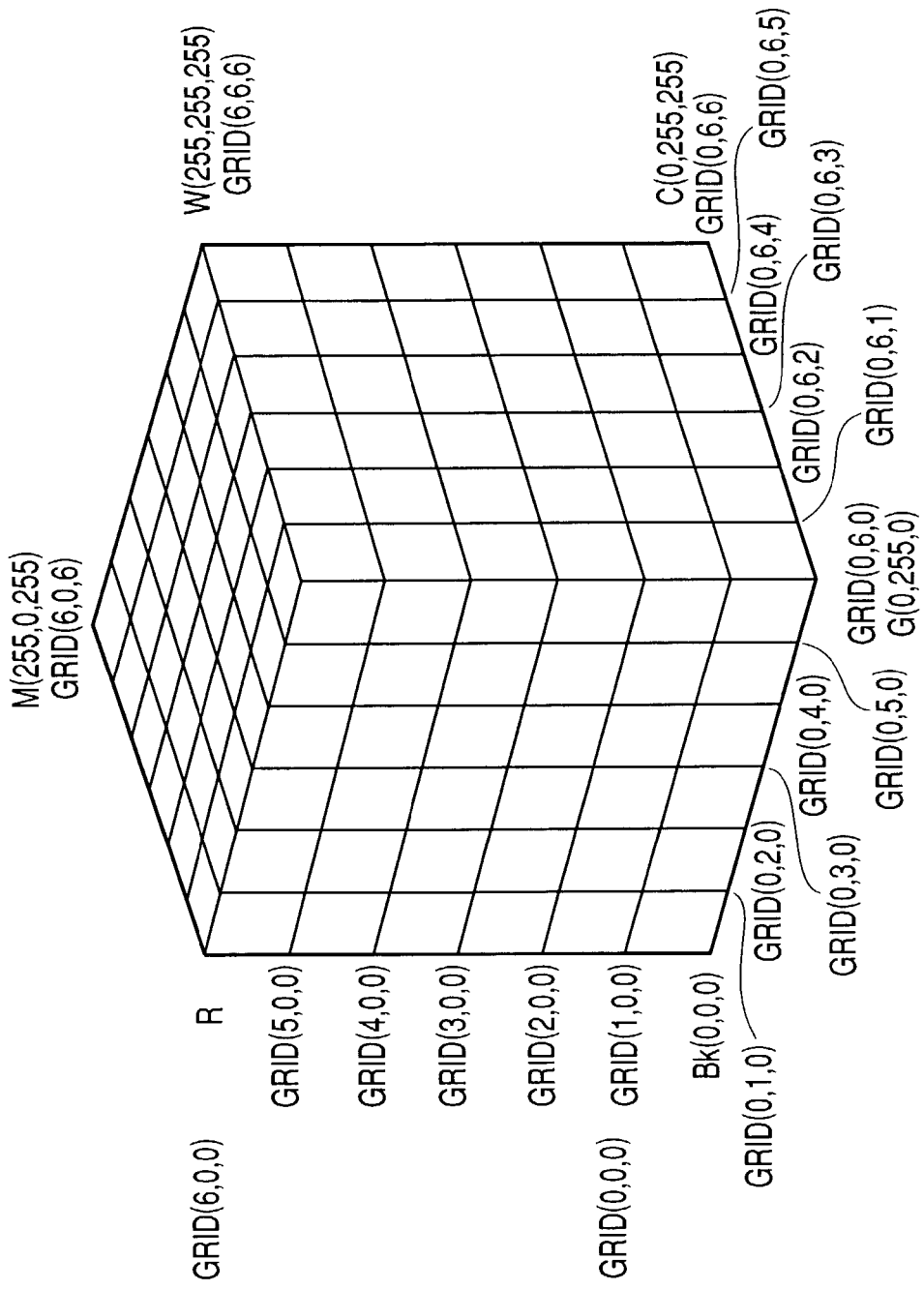
FIG. 2 is a diagram showing lattice point arrangement before a color correction process on RGB color space.
Figure 4:
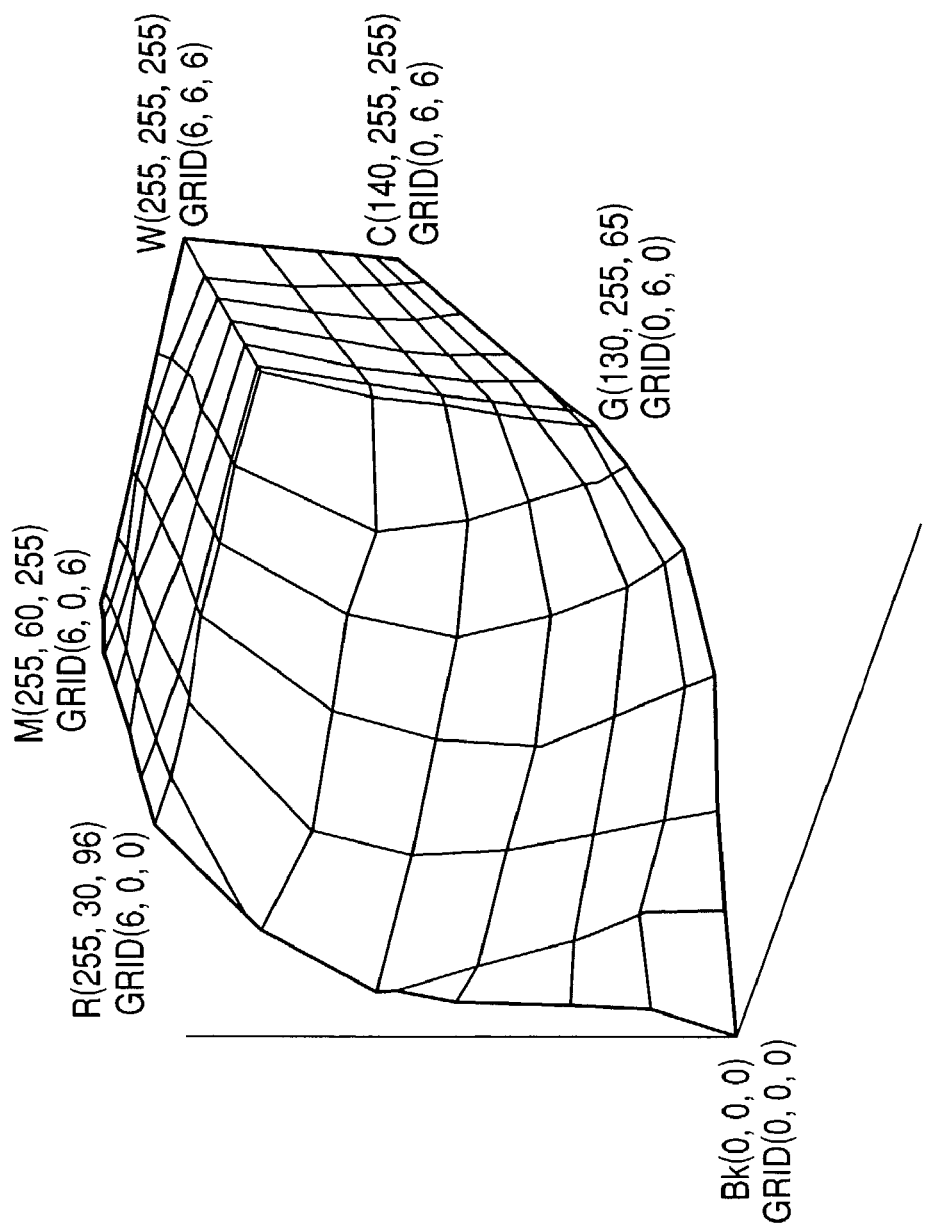
FIG. 4 is a diagram showing lattice point arrangement after the color correction process on the RGB color space.

Moreover, in the present embodiment, the color correction table 23 is the table which is used to perform a color correction process for applying the output characteristic of the printer 27 to the input R, G and B values, that is, the correspondence between the color coordinate data of lattice points regularly arranged on RGB color space and the color coordinate data after the color correction process is stored in the color correction table 23. FIG. 2 schematically shows the lattice points before the color correction process on the RGB color space. In FIG. 2, the number of the lattice points in each of R, G and B axes is set to "7", and the R, G and B values of sampling points corresponding to Bk (black), G, R, C, M and W (white) and the grid coordinates of the sampling points in the form of grid numbers are described. FIG. 3 shows the details of the color correction table 23. As shown in FIG. 3, steps of the R, G and B values are shown at the head of the table, and subsequently the color correction data are shown. FIG. 4 schematically shows the lattice points after the color correction process based on the color correction table 23. In FIG. 4, the R, G and B values of the sampling points corresponding to Bk, G, R, C, M and W after the color correction and the grid coordinates of the sampling points in the form of grid numbers are described.

In the image processing apparatus 28 shown in FIG. 1, the image data stored in the image memory 22 is supplied to the color matching processing unit 24, and the color matching between the image displayed on the color monitor 20 through the video signal generation unit 21 and the output image printed by the printer 27 through the output image processing unit 26 is performed to the image data supplied to the color matching processing unit 24. Specifically, the image data is interpolated by referring to the color correction table 23, and thus the output value corresponding to each pixel value of the image data is obtained. Then, it is controlled by the output image processing unit 26 to discharge the C, M, Y and K inks for the input R, G and B pixel values, whereby desired colors can be reproduced on the recording medium by the printer 27.

In the present embodiment, as described above, if a user judges from the printed output image or the like that tonality is not satisfactory for one or more hues, the smoothing process is performed on the color correction table 23 by the smoothing unit 25, whereby the color matching process that the user desires can be achieved.

Hereinafter, the process in the smoothing unit 25 will be explained.

Figure 5:
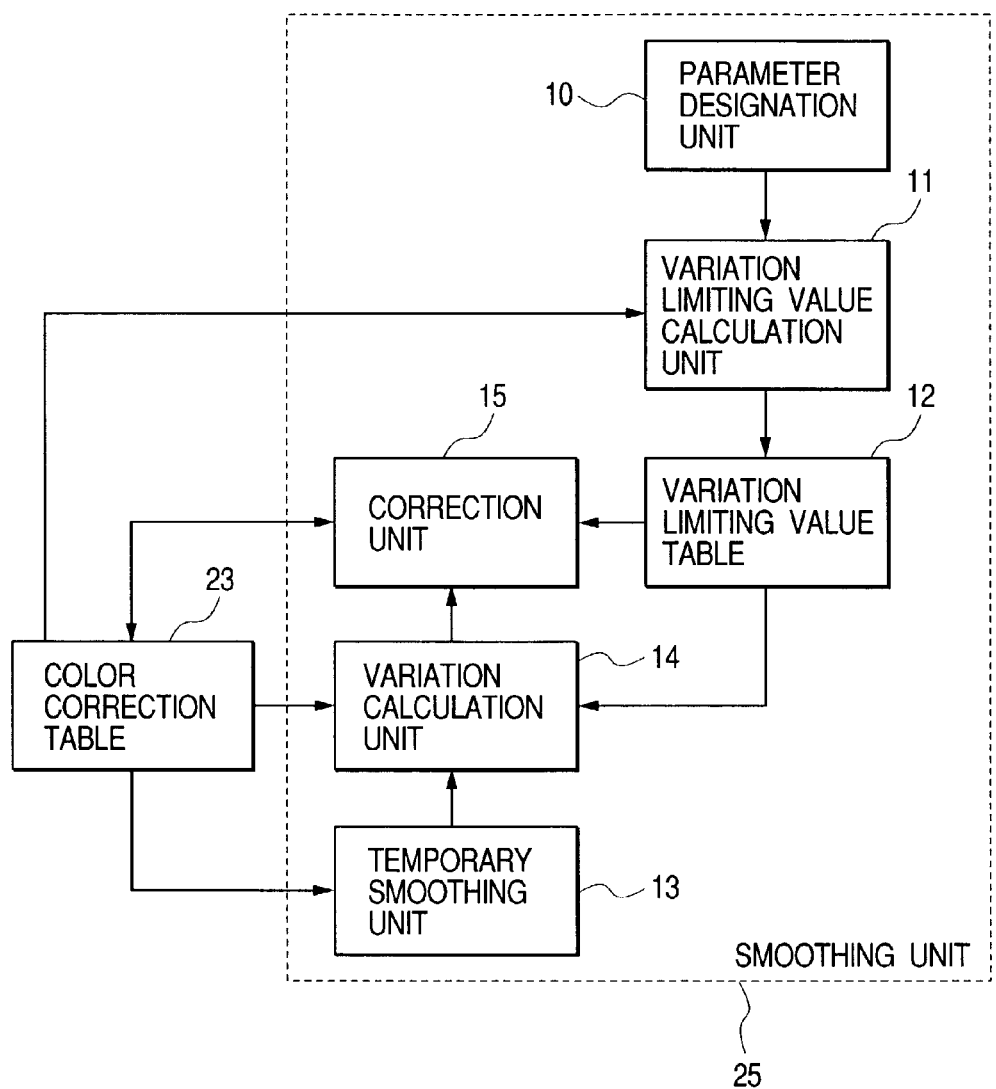
FIG. 5 is a block diagram showing the structure of the color adjustment device according to the embodiment of FIG. 1.
Figures 24, 25:
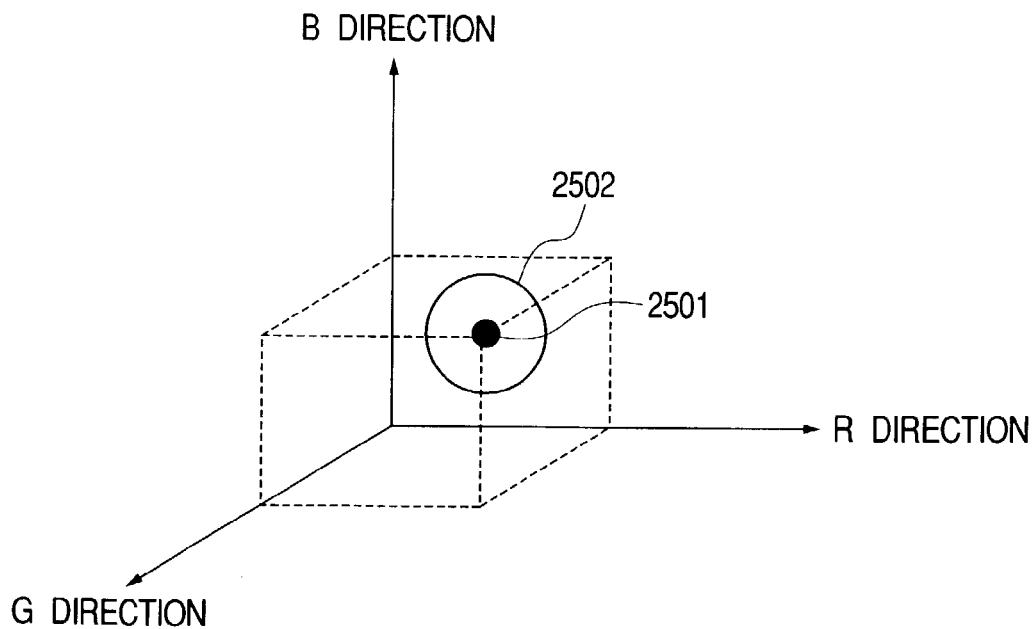
FIG. 24 is a diagram showing an example of a UI used to designate smoothing parameters in the third embodiment.
FIG. 25 is a diagram for explaining smoothing target colors and an influential range on the RGB color space.

FIG. 5 is a block diagram showing the detailed structure of the smoothing unit 25. In FIG. 25, numeral 10 denotes a parameter designation unit on which a smoothing condition when the R, G and B values stored in the color correction table 23 are shifted by the smoothing process, e.g., the limiting value of a color variation (or a color change amount) in each hue, is set by the user. Here, it should be noted that the limiting value of the color variation is simply called the variation limiting value hereinafter. Numeral 11 denotes a variation limiting value calculation unit which calculates the variation limiting value in each lattice point on the color space corresponding to all the grids of the color correction table 23, from the variation limiting value for each hue designated on the parameter designation unit 10. Numeral 12 denotes a variation limiting value table which stores therein the values calculated by the variation limiting value calculation unit 11, numeral 13 denotes a temporary smoothing unit which performs, by a filtering process or the like, the smoothing of the R, G and B values stored in the color correction table 23, and numeral 14 denotes a variation calculation unit which calculates a color difference ΔE between the R, G and B values (post-smoothing R, G and B values) smoothed by the temporary smoothing unit 13 and the R, G and B values (pre-smoothing R, G and B values) before the smoothing is performed. Numeral 15 denotes a correction unit which corrects the R, G and B values obtained by the temporary smoothing unit 13 on the basis of the color difference ΔE obtained by the variation calculation unit 14, and then stores the corrected values in the color correction table 23.

FIG. 6 is a diagram showing an example of a UI on the parameter designation unit 10. On this UI, the user designates the variation limiting values of the pre-smoothing and post-smoothing R, G and B values by using the color difference ΔE. Here, it is assumed that the variation limiting value is designated for the hue of each of the plural representative colors R, G, B, C, M and Y, as shown in FIG. 6.

FIG. 7 shows the details of the variation limiting value table 12. As shown in FIG. 7, the variation limiting values corresponding to the respective lattice points of the color correction table 23 are stored in the variation limiting value table 12.

Figure 8:
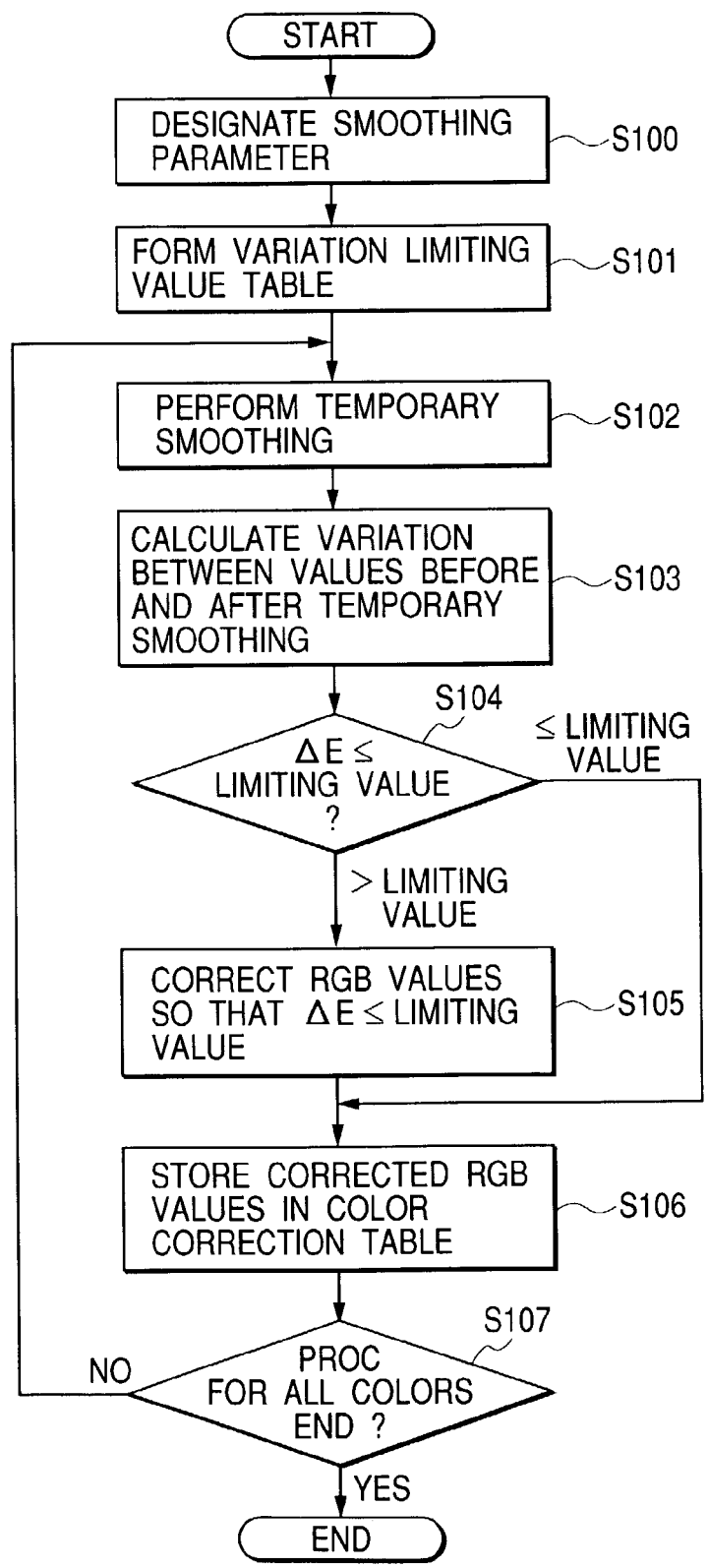
FIG. 8 is a flow chart showing a smoothing process.

Hereinafter, the smoothing process by the color adjustment apparatus according to the present embodiment will be explained in detail with reference to the flow chart shown in FIG. 8.

First, in a step S100, the variation limiting value for each hue is designated on the parameter designation unit 10. In the next step, S101, by the variation limiting value calculation unit 11, the variation limiting value corresponding to each lattice point of the color correction table 23 is calculated in a later-described method on the basis of the value designated in step S100, and the calculated variation limiting value is stored in the variation limiting value table 12. In step S102, by the temporary smoothing unit 13, smoothing of the RGB color space (hereinafter called temporary smoothing) is performed for each of the values stored in the color correction table 23. Here, it should be noted that the temporary smoothing process can be performed by averaging the R, G and B values of the lattice points adjacent in the R, G and B axes, or by using a Gaussian filter or the like.

In step S103, the color difference ΔE between the post-smoothing R, G and B values obtained in step S102 and the pre-smoothing R, G and B values is calculated by the variation calculation unit 14. Here, the color difference ΔE corresponding to the pre-smoothing and post-smoothing R, G and B values is calculated as follows. On a computer system, patch images before and after the smoothing are respectively formed by using as color patches color coordinate data of the lattice points regularly arranged on the RGB color space, the formed patch images are output by the printer 27, the output patch images are respectively subjected to a colorimetry process, and then L*a*b* values corresponding to each patch are obtained. Then, on the basis of such a colorimetry result, the L*a*b* values corresponding to the pre-smoothing and post-smoothing R, G and B values of the color correction table 23 are obtained by the interpolation, and the color difference ΔE is obtained from these two L*a*b* values. Alternatively, the color difference ΔE corresponding to the pre-smoothing and post-smoothing R, G and B values is obtained by using RGB-Lab conversion calculation in consideration of perceptual adaptation determined in CIECAM97s.

Figure 9:
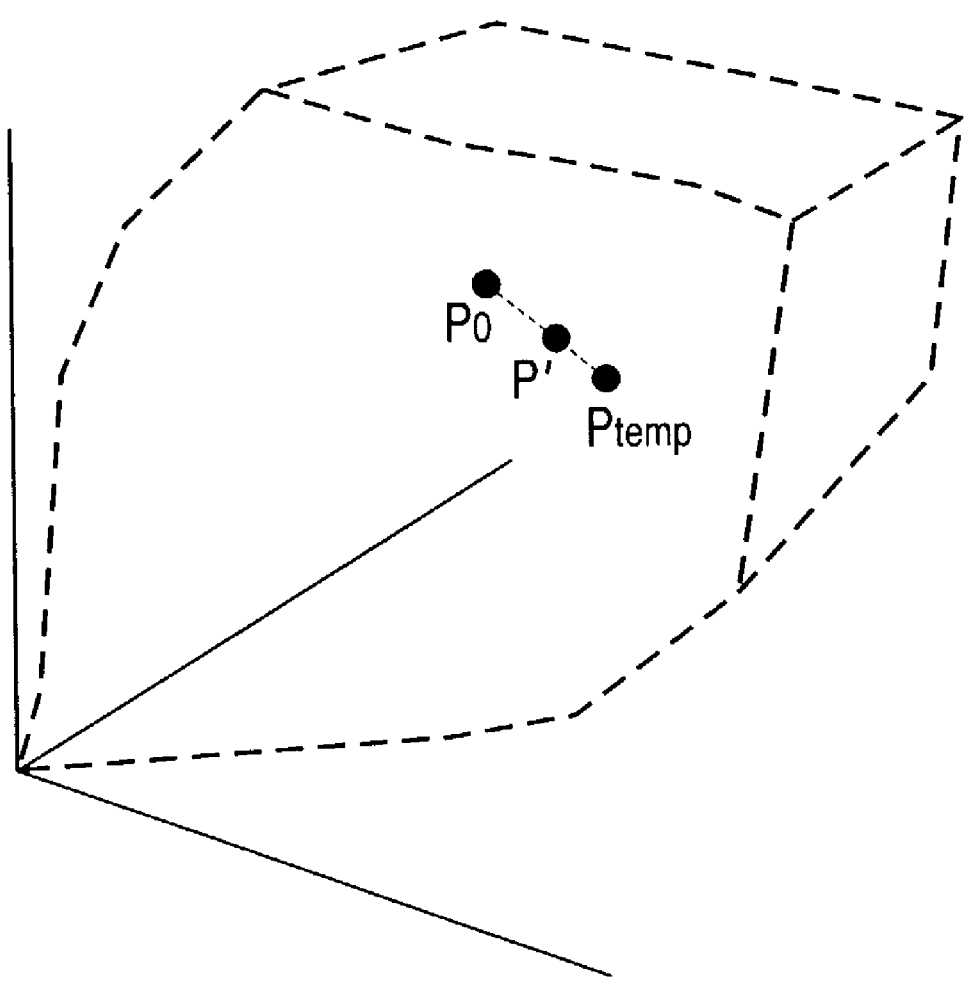
FIG. 9 is a diagram showing the relation of a color before the smoothing process, a color after temporary (or provisional) smoothing, and a color after the smoothing process on the RGB color space.

In step S104, the color difference ΔE calculated in the step S103 is compared with the corresponding variation limiting value of the variation limiting value table 12 by the correction unit 15. Then, the flow advances to step S105 if the color difference ΔE is larger than the variation limiting value, while the flow advances to step S106 if the color difference ΔE is equal to or smaller than the variation limiting value. In step S105, the post-smoothing R, G and B values are corrected by the correction unit 15 so that the color difference ΔE becomes equal to or smaller than the variation limiting value. FIG. 9 shows the relation of a color (i.e., R, G and B values) P0 before the smoothing, a color Ptemp after the temporary smoothing, and a color P' after the correction on the RGB color space. As shown in FIG. 9, the correction process is performed by the correction unit 15 so that the color P' is positioned on the line between the color P0 and color Ptemp. Subsequently, in step S106, the corrected R, G and B values are stored in the color correction table 23 by the correction unit 15. In step S107, it is confirmed whether or not the smoothing process ends for all the values of the correction table 23. If it is confirmed that the smoothing process is not at an end, the processes in steps S102 to S107 are repeated, while if the smoothing process has ended, the smoothing process of the color correction table 23 is terminated.

Figure 10:
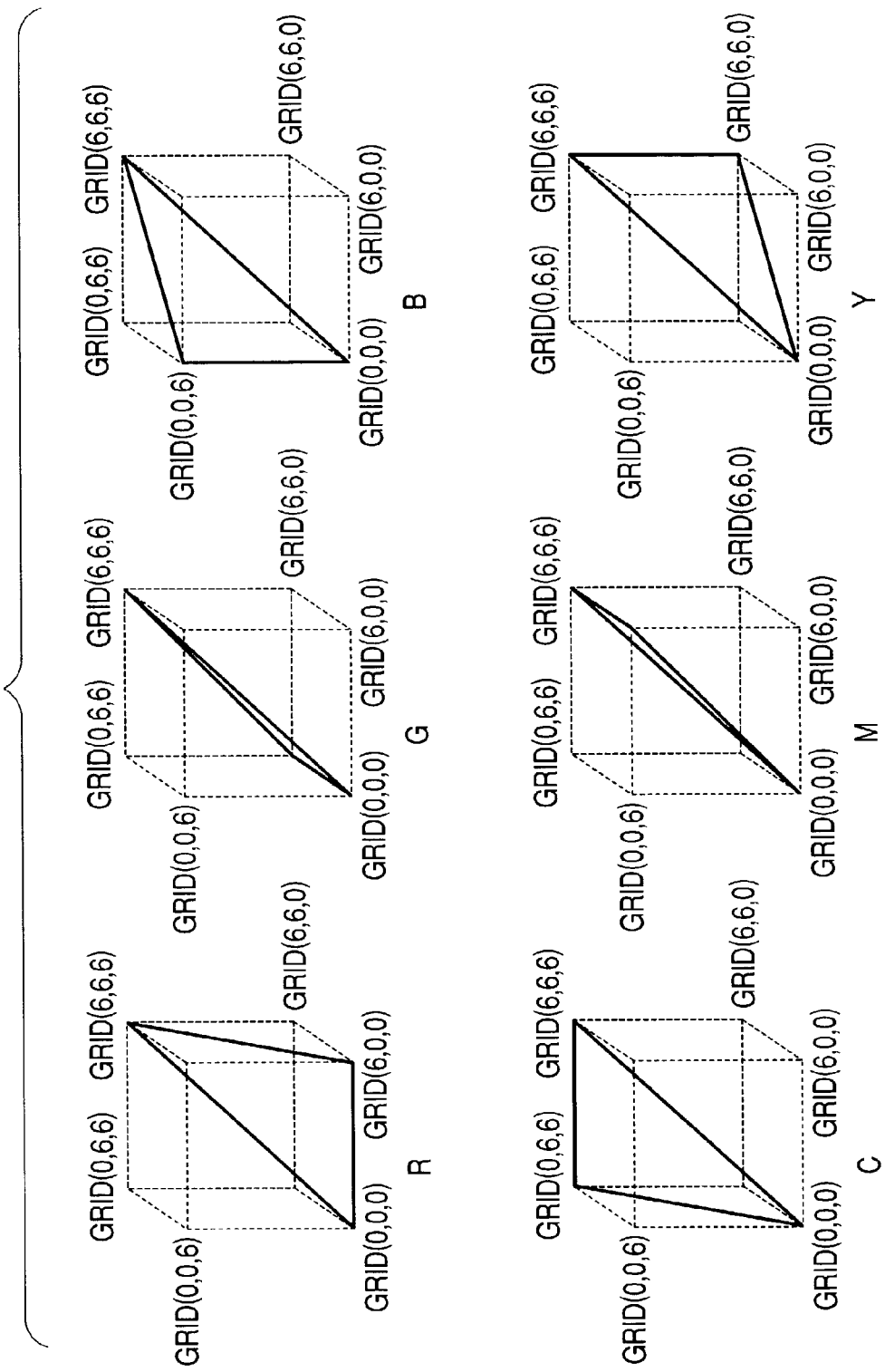
FIG. 10 is a diagram showing hue faces of W-RGBCMY-Bk on the RGB color space.

Next, a variation limiting value table forming procedure to be executed in the variation limiting value calculation unit 11 will be explained. First, on the RGB color space, the corresponding variation limiting values ΔE for the lattice points positioned on six hue faces of W-RGBCMY-Bk (white-representative colors-black) as shown in FIG. 10 are stored in the variation limiting value table 12. As the variation limiting values corresponding to the lattice points on the hue faces, the values designated by the parameter designation unit 10 are used, that is, the same variation limiting value is set for all the lattice points on the same hue face with respect to the hue faces of W-RGBCMY-Bk. However, it is assumed that the variation limiting value corresponding to each peak of W, R, G, B, C, M, Y and Bk is 0.

In the present embodiment, the variation limiting values can be set for primary colors R, G, B, C, M and Y on the RGB color space represented by R, G and B values as the input values of the color correction table.

Figures 11, 12:
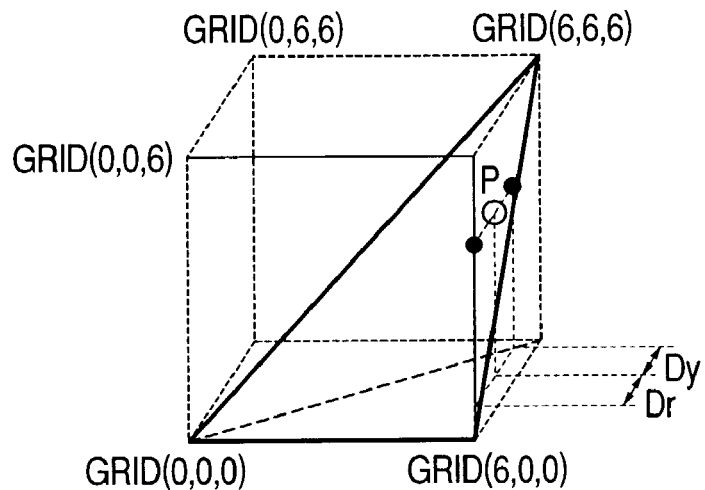
FIG. 11 is a diagram showing a tetrahedron area between a W-R-Bk hue face and a W-Y-Bk hue face.
FIG. 12 is a diagram showing an example of a UI used to designate smoothing parameters in the second embodiment.

Next, on the basis of the above variation limiting value, the variation limiting value ΔE is obtained for the lattice point within the intermediate area of the W-RGBCMY-Bk hue faces. As an example of the intermediate area, FIG. 11 shows a tetrahedron area between the W-R-Bk hue face and the W-Y-Bk hue face. Thus, the variation limiting value with respect to an arbitrary lattice point P within the tetrahedron area is calculated according to the following procedure. If the grid coordinates of the arbitrary lattice point P are (rp, gp, bp), a distance Dr from the W-R-Bk hue face of the lattice point P and a distance Dy from the W-Y-Bk hue face are obtained by the following expressions, on the line parallel with the R-Y line passing the lattice point P.

$Dr=gp-bp$ $Dy=rp-gp$

Then, a variation limiting value Ep at the lattice point P is calculated by linearly interpolating a variation limiting value Er of the W-R-Bk hue face and a variation limiting value Ey of the W-Y-Bk hue face, as follows.

$Ep=Er+(Ey-Er)*Dr/(Dy+Dr)$

Likewise, the variation limiting value Ep is obtained for the lattice point within other area by linearly interpolating the two variation limiting values of the adjacent hue faces. Thus, the variation limiting value table 12 is formed in the above manner. Here, since it is undesirable in the color reproduction that achromatic color is changed or corrected to chromatic color by the smoothing, the variation limiting value of the lattice point on the W-Bk line (gray) is set to 0.

As explained above, according to the present embodiment, since the user can designate the limiting value for the variation of the value due to the smoothing, the smoothing amount can be controlled according to the position on the color space. Thus, it is possible to control the smoothing amount with respect to the area to which the smoothing is not so necessary, the area where it is intended to suppress a change of the value due to the smoothing process from colorimetry or subjective viewpoint, and the like. As a result, color reproducibility can be improved as compared with the conventional technique.

Moreover, since the smoothing amounts of the adjacent two hues are obtained by the interpolation, the problem of a pseudo-contour or the like due to the smoothing process does not easily arise even if the smoothing amounts of the adjacent two hues are remarkably different from each other, whereby it is possible to set appropriate smoothing conditions.

Moreover, since the smoothing amount is designated by using the distance ($\Delta E$) on CIE-Lab space, the smoothing amount according to the output device, the recording sheet and the like can be set as the value closer to the user's perception.

Second Embodiment

Hereinafter, the second embodiment of the present invention will be explained.

The first embodiment describes an example in which the smoothing amount is designated for each six hues. In the present embodiment, on the other hand, the six hues are further divided into the light portion and the dark portion, whereby the variation limiting values in the smoothing can be designated for 12 areas of W-RGBCMY (white-representative colors), and RGBCMY-Bk (representative colors-black). FIG. 12 shows an example of the UI on the parameter designation unit 10 according to the second embodiment. That is, by using the UI, a user designates the variation limiting value for each of the areas W-R, W-G, W-B, W-C, W-M, W-Y, R-Bk, G-Bk, B-Bk, C-Bk, M-Bk and Y-Bk.

Figure 13:
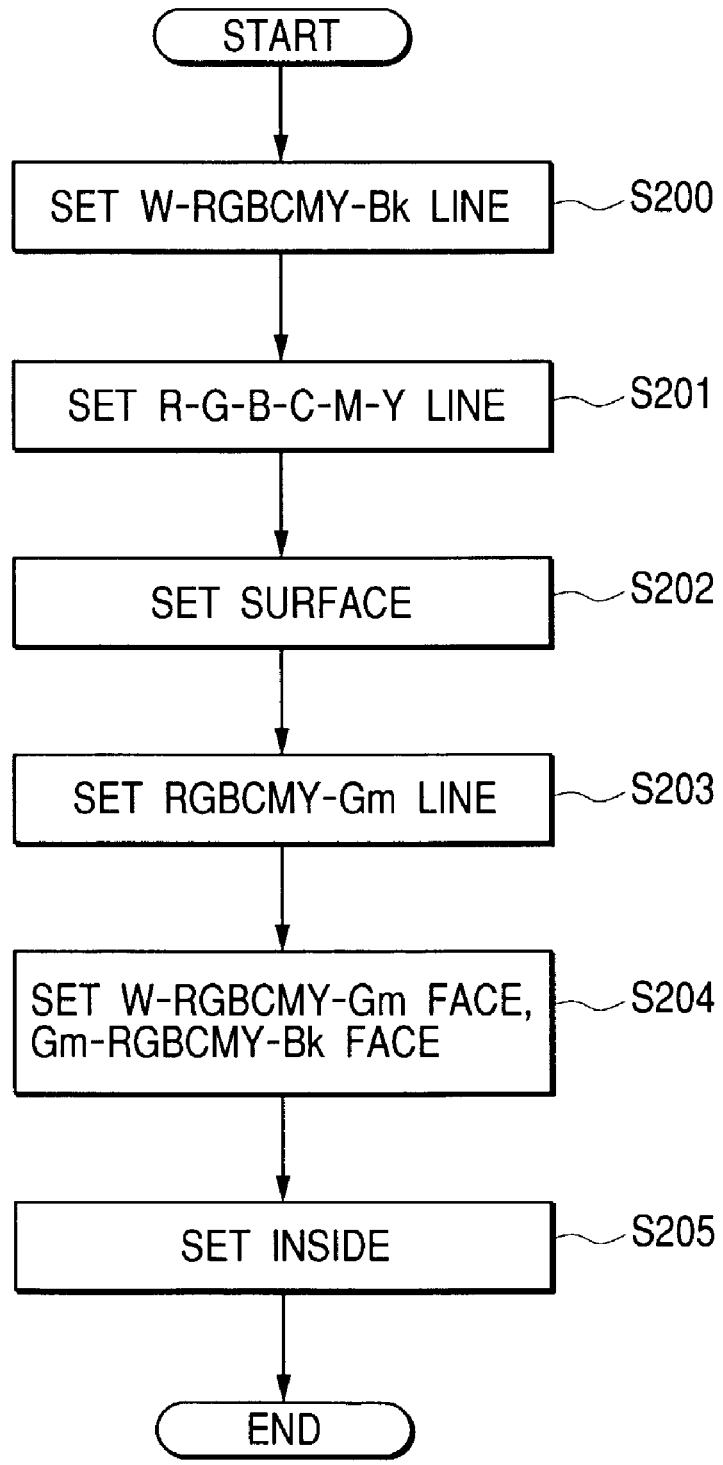
FIG. 13 is a flow chart showing a process to form the variation limiting value table in the second embodiment.

Hereinafter, a method of forming the variation limiting value table 12 in the second embodiment will be explained in detail with reference to a flow chart shown in FIG. 13. Here, it should be noted that the structural components of the image processing apparatus in the second embodiment are treated as the same components as those in the first embodiment.

First, in a step S200, the variation limiting values corresponding to the lattice points positioned on the 12 lines of W-RGBCMY and RGBCMY-Bk on the RGB color space are stored in the variation limiting value table 12. As described above, the variation limiting values corresponding to the lattice points on the 12 hue faces are designated on the parameter designation unit 10.

Figure 14:
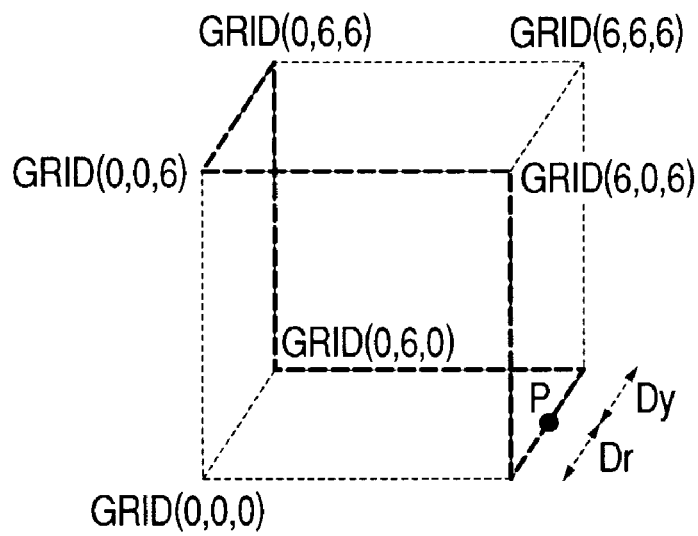
FIG. 14 is a diagram showing a line connecting RGB-CMY.

In the next step, S201, the variation limiting values corresponding to the lattice points on the lines (R-Y, Y-G, G-C, C-B, B-M, M-R) connecting the six representative colors are set. FIG. 14 shows the lines connecting the six representative colors. Hereinafter, a method of calculating a variation limiting value Ep corresponding to a lattice point P on the R-Y line will be explained. Here, it should be noted that the variation limiting values corresponding to the lattice points on other lines are obtained in the same manner as for the variation limiting value Ep.

First, distances Dr and Dy from R and Y to the lattice point P on the R-Y line are obtained respectively, and then the variation limiting value Ep of the lattice point P is calculated as follows:

$$Ep = Ermin + (Eymin - Ermin) * Dr/(Dr + Dy)$$

$$Ermin = min(Ewr, Erk)$$

$$Eymin = min(Ewy, Eyk)$$

where Ewr, Erk, Ewy and Eyk indicate the variation limiting values respectively corresponding to the W-R, R-Bk, W-Y and W-Bk lines designated by the parameter designation unit 10, and $min(\alpha, \beta)$ indicates a function to select the smaller one of the values $\alpha$ and $\beta$.

Figure 15:
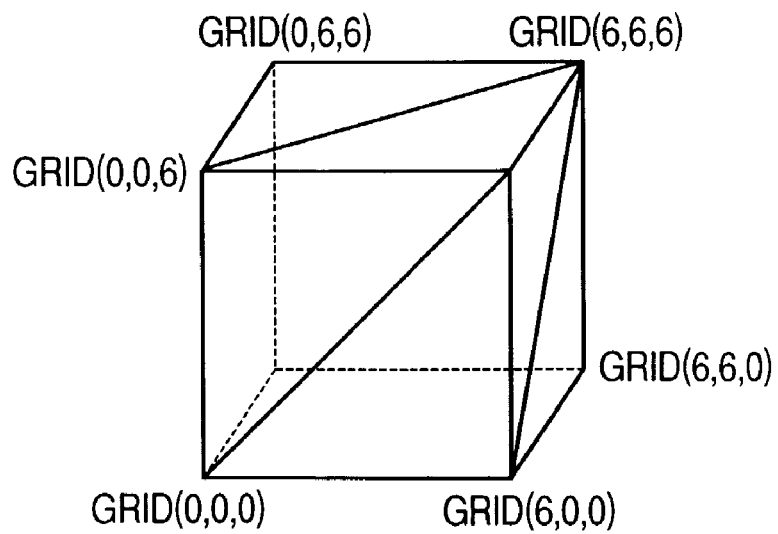
FIG. 15 is a diagram showing a dodecahedron formed by two representative colors adjacent to W, adjacent two representative colors, and Bk.
Figure 16:
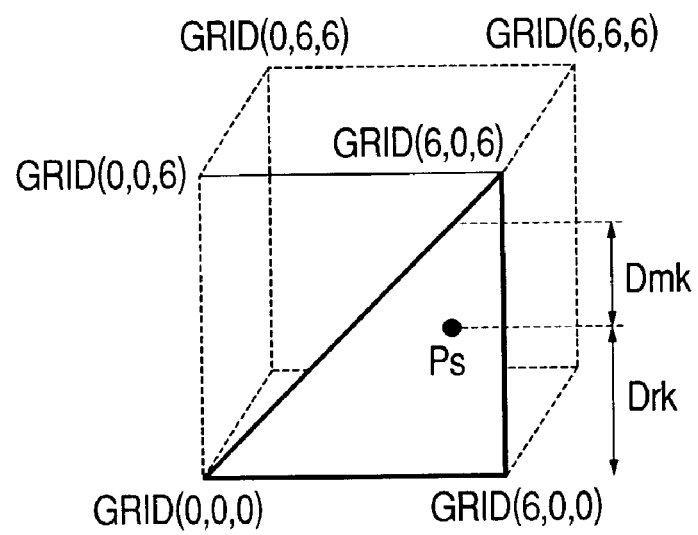
FIG. 16 is a diagram for explaining a method of calculating a variation limiting value corresponding to a lattice point Ps on an R-M-Bk face.

The process further advances to step S202 to set the variation limiting values corresponding to the lattice points (to which any variation limiting value is not yet set in steps S200 and S201) positioned on the surface of RGB color space (cubic area). In step S202, as shown in FIG. 15, the variation limiting values are set to the 12 areas formed by W and the adjacent two representative colors, or the adjacent two representative colors and Bk. Hereinafter, a method of calculating a variation limiting value Eps corresponding to a lattice point Ps on the R-M-Bk face (inside the triangle) will be explained with reference to FIG. 16. First, in the B-axis direction, a distance Dmk of the lattice point Ps from the M-Bk line and a distance Drk thereof from the R-Bk line are obtained. It should be noted that FIG. 16 shows the relation of the lattice point Ps and the distances Dmk and Drk. Then, the variation limiting value Eps corresponding to the lattice point Ps is calculated as follows:

$$Eps = Emk + (Erk - Emk) * Dmk/(Drk + Dmk)$$

where Emk indicates the variation limiting value corresponding to the M-Bk line designated on the parameter designation unit 10.

Likewise, the variation limiting values corresponding to the adjacent two representative colors and the two lines connecting W and Bk are obtained by linear interpolation, for the lattice point on other surface.

Figure 17:
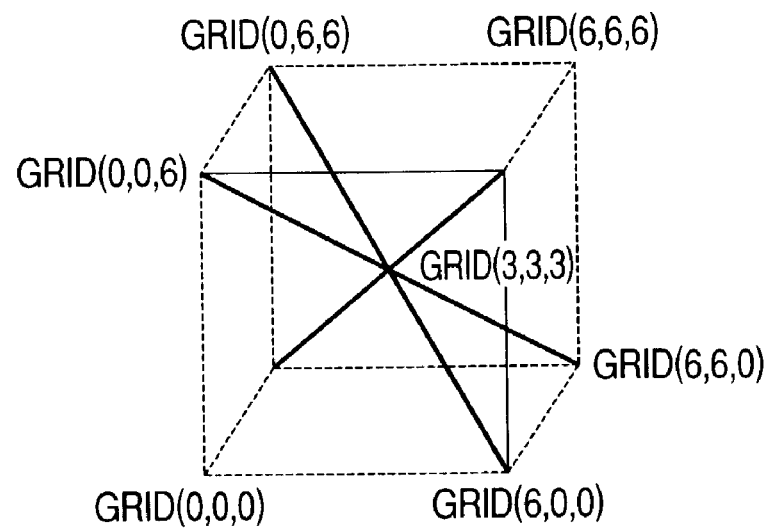
FIG. 17 is a diagram showing an RGBCMY-Gm line.

After the variation limiting values for the lattice points on the surface of the RGB color space are set, the flow advances to step S203 to set the variation limiting value of an RGBCMY-Gm (representative colors-intermediate gray) line shown in FIG. 17. Here, Gm indicates an intermediate lattice point on a gray line. That is, if it is assumed that the number of lattice points in each axis direction is N, the grid coordinates of Gm are (N/2, N/2, N/2). The variation limiting value corresponding to the W-RGBCMY line and the variation limiting value corresponding to the RGBCMY-Bk line respectively for the same hue are compared with each other, and the smaller value obtained is used as the variation limiting value corresponding to the RGBCMY-Gm line. For example, the smaller one of the limiting value of the W-R line and the limiting value of the R-Bk line designated on the parameter designation unit 10 is set as the variation limiting value corresponding to the lattice point on the R-Gm line.

Figure 18:
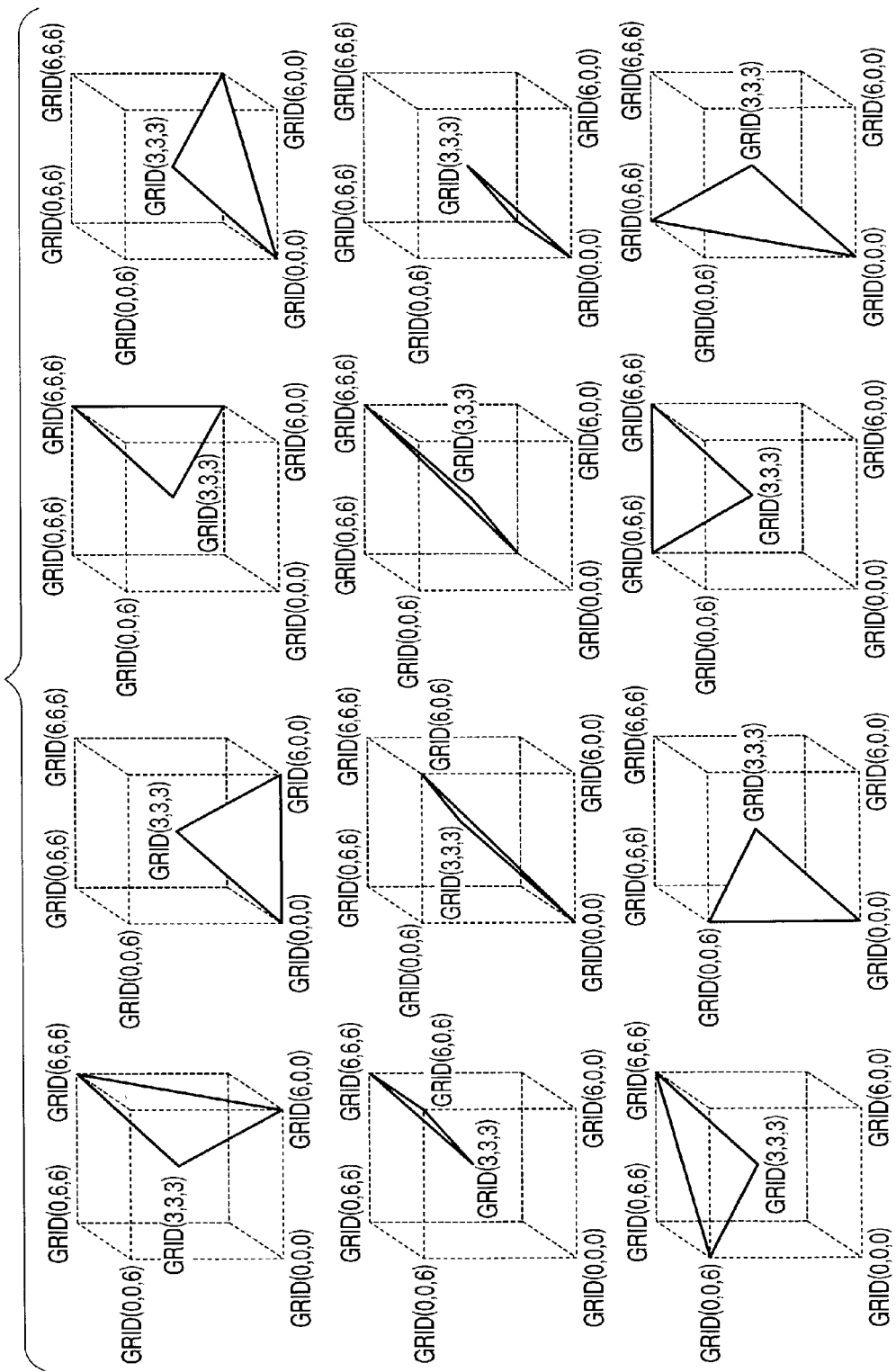
FIG. 18 is a diagram showing a W-RGBCMY-Gm face and a Gm-RGBCMY-Bk face.
Figure 19:
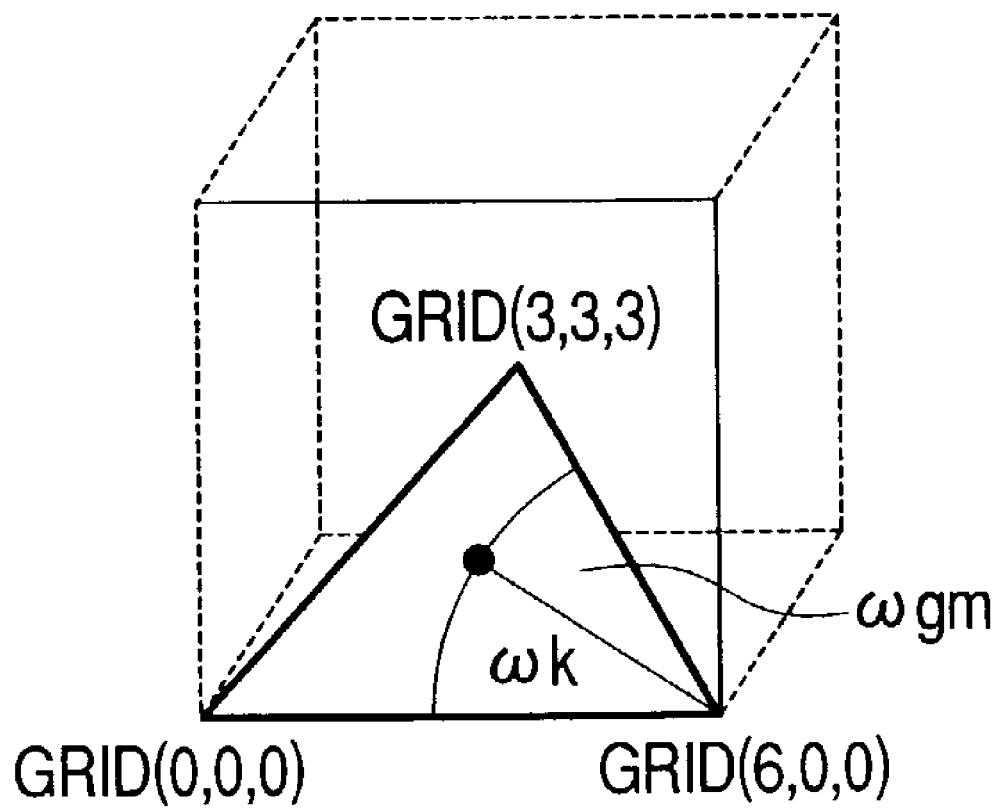
FIG. 19 is a diagram for explaining a method of calculating the variation limiting value corresponding to a lattice point Pi on a Gm-R-Bk face.

Next, in step S204, the variation limiting values are set for the lattice points on a W-RGBCMY-Gm face and a Gm-RGBCMY-Bk face (inside the triangle) shown in FIG. 18. Hereinafter, a method of calculating a variation limiting value Ei corresponding to a lattice point Pi on the Gm-R-Bk face will be explained. As shown in FIG. 19, angles $\omega gm$ and $\omega k$ of the lattice point Pi from the R-Gm line and the R-Bk line are first calculated, and then the variation limiting value Ei corresponding to the lattice point Pi is calculated as follows:

$$Ei = Ergm + (Erk - Ergm) * \omega gm/(\omega gm + \omega k)$$

where Ergm indicates the variation limiting value corresponding to the R-Gm line set in step S203. Likewise, the variation limiting value corresponding to the lattice point on the other Gm-RGBCMY-Bk face is calculated on the basis of an angle ratio from the Gm-RGBCMY line and the RGBCMY-Bk line, and also the variation limiting value corresponding to the lattice point on the W-RGBCMY-Gm face is calculated likewise on the basis of an angle ratio from the W-RGBCMY line and the RGBCMY-Gm line.

Figure 20:
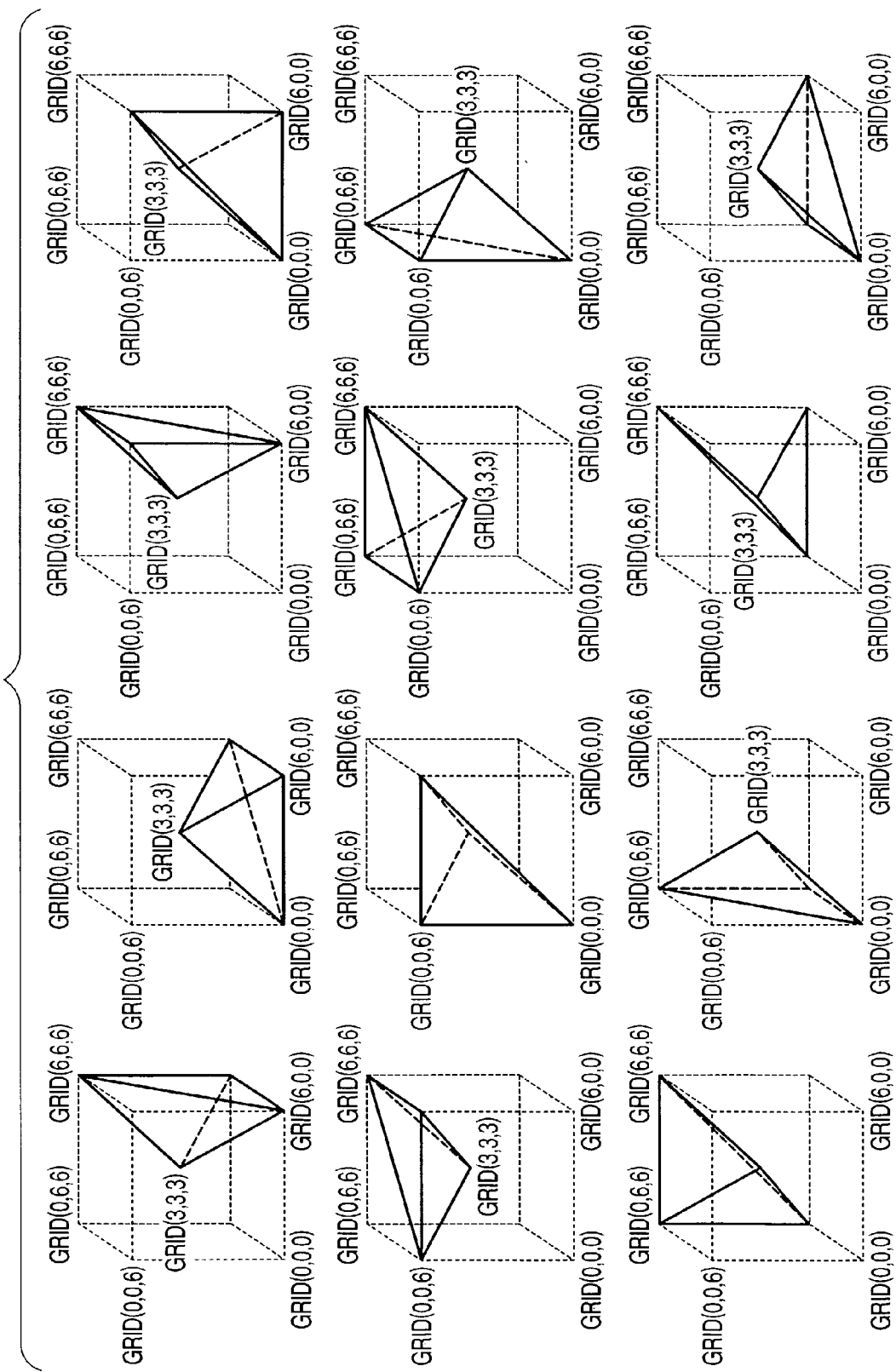
FIG. 20 is a diagram showing tetrahedron areas having peaks of W-adjacent two representative colors-Gm and Gm-adjacent two representative colors-Bk.
Figure 21:
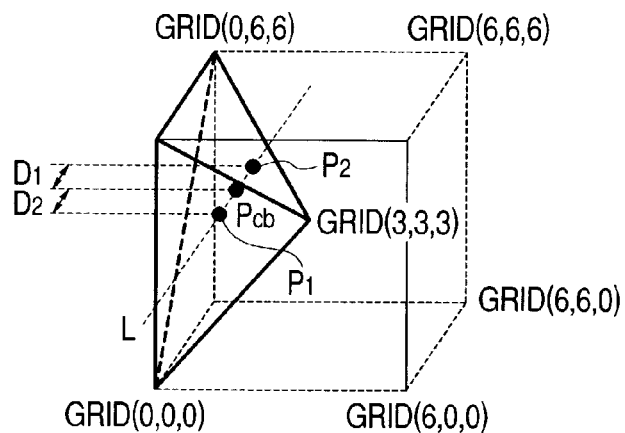
FIG. 21 is a diagram for explaining a method of calculating the variation limiting value corresponding to a lattice point Pcb within a tetrahedron area having peaks of Gm, C, B and Bk.

Finally, in step S205, the variation limiting values corresponding to the lattice points inside the 12 tetrahedron areas respectively having the peaks of W-adjacent two representative colors-Gm and Gm-adjacent two representative colors-Bk. FIG. 20 shows the 12 tetrahedron areas. Hereinafter, a method of calculating a variation limiting value Ecb corresponding to an arbitrary lattice point Pcb within the tetrahedron area having the peaks of Gm, C, B and Bk will be explained with reference to FIG. 21. First, a line L passing the lattice point Pcb and parallel with the G-axis and intersection points P1 and P2 of the line L respectively to the Gm-B-Bk hue face and the Gm-C-B hue face are obtained. If it is assumed that the grid coordinates of the lattice point Pcb are (rc, gc, bc), the grid coordinates of the intersection points P1 and P2 are respectively (rc, rc, bc) and (rc, bc, bc). Then, distances D1 and D2 of the lattice point Pcb from the intersection points P1 and P2 are respectively obtained as follows:

$$D1 = gc - rc$$

$$D2 = bc - gc$$

Then, the variation limiting value Ecb at the lattice point Pcb is calculated by linearly interpolating variation limiting values E1 and E2 at the respective intersection points P1 and P2, as follows:

$$Ecb = E1 + (E2 - E1) * D1/(D1 + D2)$$

The variation limiting values are likewise obtained for the points in other areas, by linearly interpolating the two variation limiting values on the adjacent hue faces. Then, the process of forming the variation limiting value table 12 ends.

As explained above, according to the second embodiment, the user can further divides the smoothing amount of the six hues into the light portion and the dark portion, whereby it is possible to perform a more finely controlled smoothing process on the color correction table 23. Moreover, in a case where a value larger than 0 is set as the variation limiting value for one area and 0 is set as the variation limiting value for its adjacent area, the variation limiting value of larger than 0 is not diffused to the adjacent area, and thus, for example, it is possible to fix the value only for the area where it is intended to suppress a change of the value on the color correction table 23.

In the above first and second embodiments, the example that the variation limiting value in the area between the adjacent hues is linearly changed with respect to the distances and the angles from the respective lattice points when the variation limiting value table is set is explained. However, in this case, the variation limiting value might be non-linearly changed.

Moreover, in the above embodiments, the user designates the variation limiting value for each of the six hues (first embodiment) and the light and dark portions of the six hues (second embodiment). However, the user might use other designation methods, e.g., a method of more finely dividing brightness and then designating the variation limiting value, a method of designating the variation limiting value according to saturation, and the like.

Third Embodiment

Hereinafter, the third embodiment of the present invention will be explained. Here, it should be noted that the same structural components as those in the first and second embodiments are denoted by the same reference numerals and symbols as those in the first and second embodiments, and the detailed explanations thereof are omitted.

Figure 22:
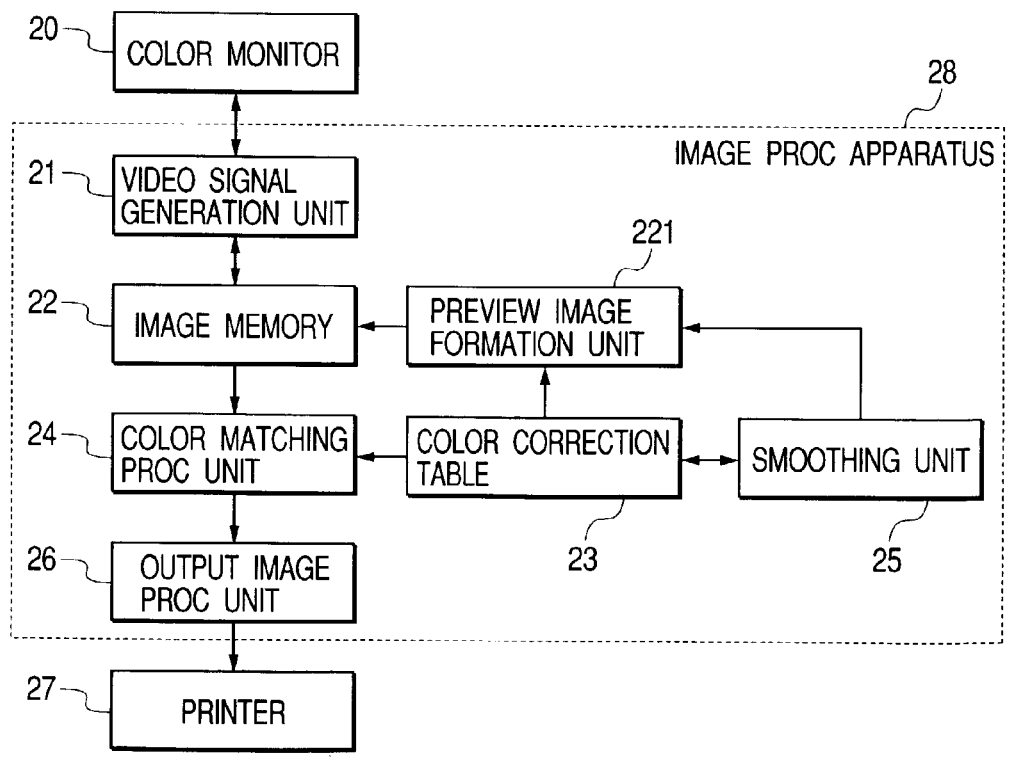
FIG. 22 is a block diagram showing the structure of an image processing apparatus to which a color adjustment device according to the embodiment is applied.

FIG. 22 is a block diagram showing the structure of an image processing apparatus according to the present embodiment. The image processing apparatus according to the third embodiment is structured by adding a preview image formation unit 221 to the image processing apparatus according to the first and second embodiments, and is characterized in that the result of a smoothing process by a smoothing unit 25 can be confirmed by monitor display.

Figure 23:
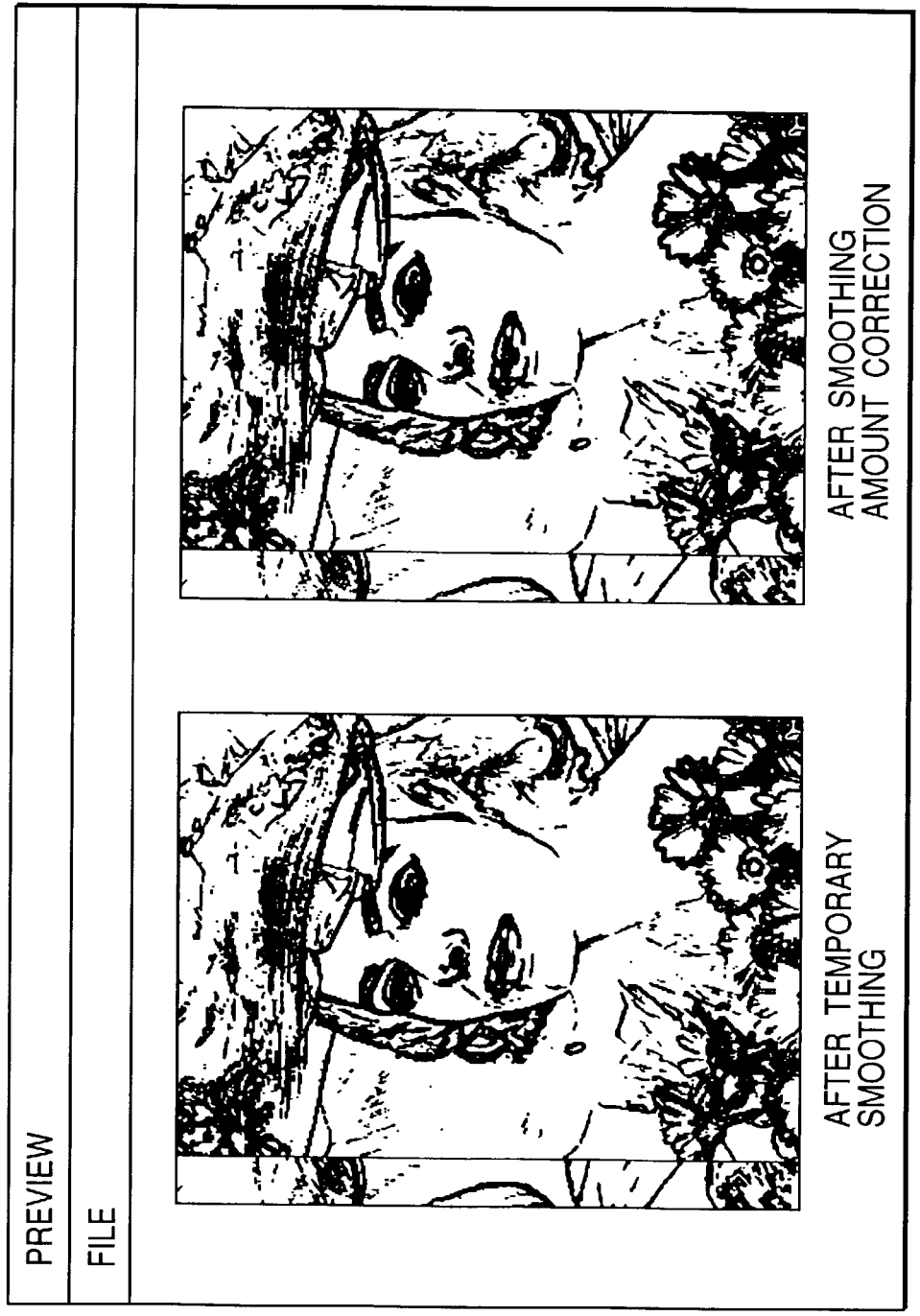
FIG. 23 is a diagram showing an example of a preview screen.

FIG. 23 is a diagram showing a basic example of a preview screen which is formed by the preview image formation unit 221 and then displayed on a color monitor 20. On the preview screen, an image which is obtained by converting an original image by using a color correction table 23 subjected to a temporary smoothing process by a temporary smoothing unit 13 is displayed on the left, and an image which is obtained by converting the original image by referring to the color correction table 23 to which R, G and B values after the temporary smoothing are corrected with use of a variation limiting value table 12 is displayed on the right. A user can designate an arbitrary original image by using the preview screen on a UI.

As explained above, the preview screen where the color correction table after the temporary smoothing is performed and the color correction table after the variation limiting value is applied are applied to the image is displayed, whereby the user can easily confirm the effect of the adjustment of the smoothing amount in the above first and second embodiment on the image display.

Fourth Embodiment

Hereinafter, the fourth embodiment of the present invention will be explained.

In the above embodiments, the smoothing amount is designated for each of the predetermined areas on the color space. On the other hand, the present embodiment is characterized in that a color to be smoothed (i.e., smoothing target color) and its influential range can be designated by a user. Here, it should be noted that the structural components of the image processing apparatus in the fourth embodiment are treated as the same components as those in the third embodiment.

FIG. 24 is a diagram showing an example of a UI of a parameter designation unit 10 according to the fourth embodiment. In FIG. 24, numeral 2401 denotes an item for setting correction (smoothing) target R, G and B values, that is, the color to which a variation limiting value of smoothing is designated is set on R, G and B coordinates by using the item 2401. Numeral 2402 denotes an item for setting a variation limiting value, that is, the variation limiting value in the correction target R, G and B values is set as a color difference ΔE by using the item 2402. Numeral 2403 denotes an item for setting an influential range, that is, the range of a spherical area based on the correction target R, G and B values is set by using the item 2403. Incidentally, if a user checks off a check box 2404 showing "DESIGNATE RGB VALUES FROM IMAGE", the preview screen shown in FIG. 23 or the original image is displayed, and then the user clicks points on the image by a mouse to set the correction target R, G and B values. FIG. 25 is a notional diagram for explaining the set correction target R, G and B values and the set influential range on the RGB color space. In FIG. 25, numeral 2501 denotes the coordinates of the set correction target R, G and B values, that is, a spherical influential range 2502 is set based on the correction target R, G and B values in accordance with the set influential range 2502.

Figure 26:
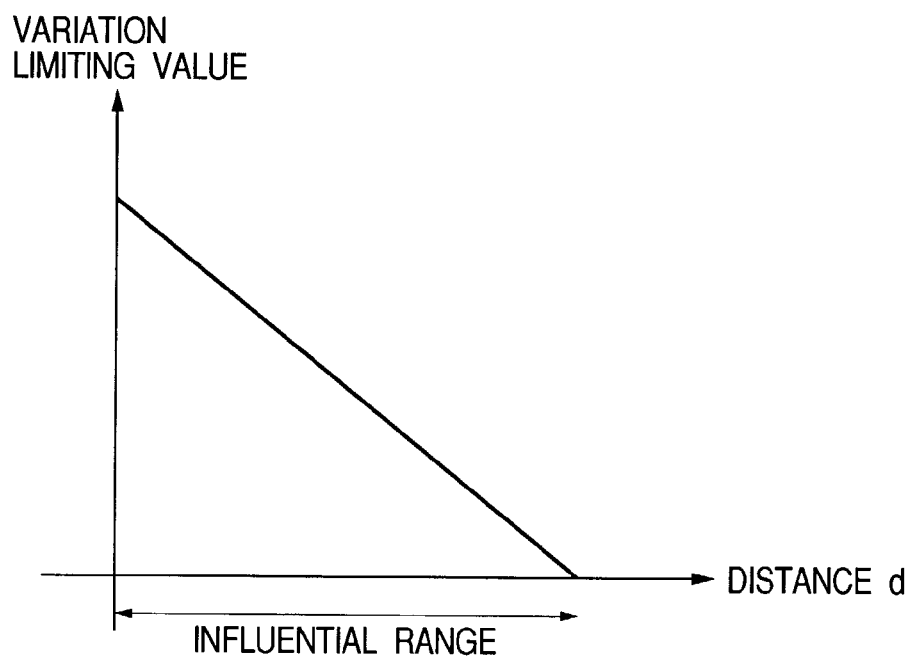
FIG. 26 is a diagram showing an example of the relation between the distance from the smoothing target R, G and B values and the variation limiting value.
Figure 27:
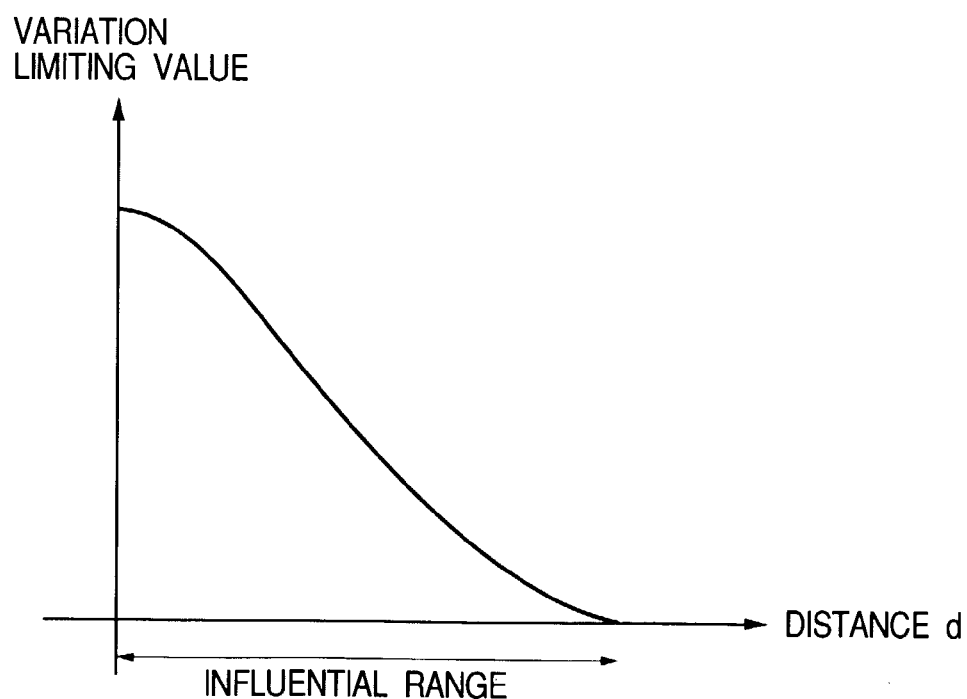
FIG. 27 is a diagram showing an example of the relation between the distance from the smoothing target R, G and B values and the variation limiting value.

FIG. 26 is a graph showing the relation between a distance d from the correction target R, G and B values on the RGB color space and the variation limiting value. As shown in FIG. 26, a smoothing unit 25 corrects the R, G and B values after the temporary smoothing so that the variation limiting value decreases as the distance d from the correction target R, G and B values increases, and thus the variation limiting value is minimized on the boundary of the influential range. Incidentally, FIG. 26 shows an example that the variation limiting value linearly changes in relation to the distance from the correction target R, G and B values. However, the variation limiting value can of course change nonlinearly as shown in FIG. 27. Moreover, as the influential range 2502, for example, an elliptic-spherical range, a cuboid range or the like can be used likewise the spherical range.

As explained above, according to the present embodiment, the color being the target of the smoothing and its influential range can be designated by the user, whereby freer control becomes possible. Also, the color being the target of the smoothing can be selected on the image, whereby the color being the target of the smoothing can be more intuitively and accurately designated.

For example, the above first to fourth embodiments can be modified as follows.

Although the variation limiting value is defined as the distance (i.e., color difference ΔE) on the Lab color space in the embodiments, the variation limiting value can be defined also as a distance on other color space such as RGB color space.

Moreover, although the smoothing process of the data stored in the color correction table is performed on the RGB color space in the embodiments, the smoothing process can be performed also in other color space such as Lab color space, CMY color space, XYZ color space or the like.

Moreover, although the variation limiting value is used as the smoothing condition in the embodiments, other parameter for controlling a degree of the smoothing process can be used. For example, a coefficient used in the smoothing process can be used.

Moreover, although the variation limiting value is manually set by the user in the embodiments, a preset variation limiting value may be used.

As explained above, the smoothing condition for each of the plural positions on the color space can be controlled, whereby the pseudo contour at the position on the certain color space can be controlled by the smoothing process, and color reproducibility can be prevented from changing more than necessity by the smoothing process, whereby it is possible to improve the color reproducibility.

Fifth Embodiment

<Structure>

Figure 28:
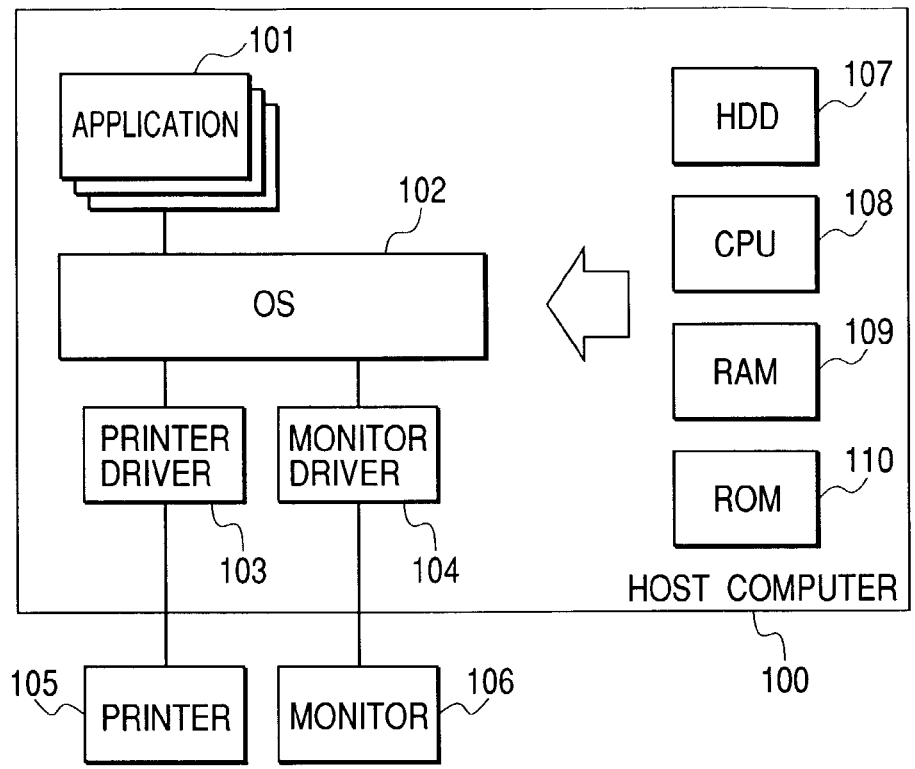
FIG. 28 is a block diagram showing a system structure according to the fifth embodiment.

FIG. 28 is a block diagram showing the schematic structure of an image processing apparatus according to the fifth embodiment.

In FIG. 28, a host computer 100 has software including application programs 101 such as a word-processing program, a spreadsheet program, a browser and the like, an OS (operating system) 102, a printer driver 103, and a monitor driver 104. Here, the printer driver 103 is the program to perform drawing processes based on various drawing instructions (an image drawing instruction, a text drawing instruction, a graphics drawing instruction, etc.) issued from the application programs 101 to the OS 102 and is to generate print data representing output images, and the monitor driver 104 is the program to generate image data to be displayed on a monitor 106.

Also, the host computer 100 has hardware including a CPU 108, an HDD (hard disk driver) 107, a RAM 109, and a ROM 110 to operate the above software.

Here, as the structure of the host computer 100 shown in FIG. 28, a personal computer that Windows™ is installed as the OS 102 and an arbitrary application program having a print function is installed as the application program 101 can be thought. Moreover, for example, an ink-jet printer can be used as a printer 105, and a CRT, an LCD or the like can be used as a monitor 106.

The application program 101 of the host computer 100 is to generate, on the basis of the image displayed on the monitor 106, output image data to be printed, by using text data classified into texts such as characters and the like, graphics data classified into graphics such as figures and the like, image data classified into a photographic image and the like. In case of printing the output image, a print request is first issued from the application program 101 to the OS 102, that is, a group of drawing instructions of which the text data portion is made as the text drawing instruction, the graphics data portion is made as the graphics drawing instruction, and the image data portion is made as the image drawing instruction is sent to the OS 102.

If the print request is received by the OS 102, the group of drawing instructions is transferred to the printer driver 103 corresponding to the printer which should perform the printing. Then, the print request and the group of drawing instructions input from the OS 102 are processed by the printer driver 103, the print data capable of being printed by the printer 105 is generated based on the processed result, and the generated print data is then transferred to the printer 105.

If the printer 105 is a raster printer, in response to the group of drawing instructions, the printer driver 103 sequentially performs image correction processes and then sequentially rasterizes the processed images into an RGB 24-bit page memory. After all the drawing instructions are rasterized, the printer driver 103 converts the R, G and B data stored in the page memory into a data format capable of being printed by the printer 106, e.g., C, M, Y and K data, and then transfers the obtained C, M, Y and K data to the printer 105.

Figure 29:
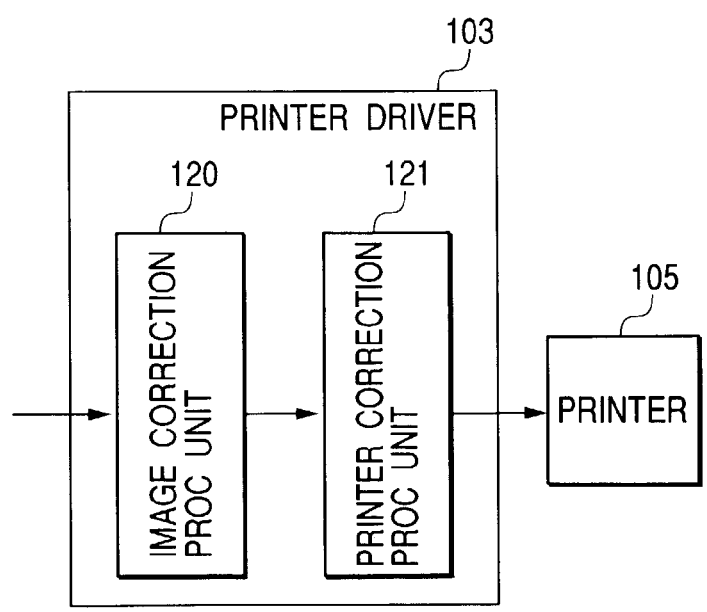
FIG. 29 is a block diagram for explaining a process by a printer driver according to the fifth embodiment.

FIG. 29 is a block diagram for explaining a process by the printer driver 103.

In FIG. 29, an image correction processing unit 120 performs the image correction process to color information included in the group of drawing instructions input from the OS 102. More specifically, the image correction processing unit 120 converts the R, G and B color information into brightness and color difference signals, performs an exposure correction process to the brightness signal, and then reversely converts the corrected brightness and color difference signals into the R, G and B color information.

A printer correction processing unit 121 rasterizes the image on the basis of the drawing instruction, by referring to the R, G and B color information processed by the image correction processing unit 120, and then generates the raster image on the page memory. Furthermore, the printer correction processing unit 121 performs various processes such as color reproduction space mapping (gamut mapping), color separation into C, M, Y and K, gradation correction and the like to the raster image, and then generates the C, M, Y and K data to determine the color reproducibility of the printer 105 for each pixel.

Figure 30:
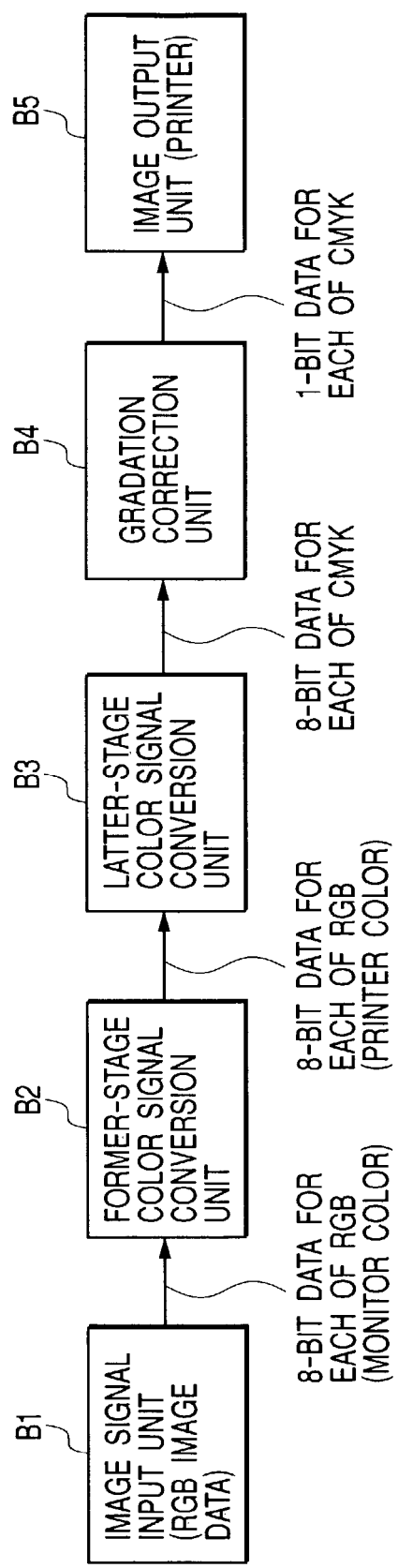
FIG. 30 is a block diagram for explaining a color process by the printer driver according to the fifth embodiment.

FIG. 30 is a block diagram for explaining in detail the process by the printer correction processing unit 121.

In FIG. 30, input image data B1 is subjected to a color matching process by a former-stage color signal conversion unit B2, a color separation process in consideration of the characteristic of the ink-jet printer by a latter-stage color signal conversion unit B3, and a gradation correction process and a halftone process by a gradation correction unit B4. Then, the processed image data is transferred as CMYKcm dot information corresponding to each ink to a printer B5, whereby the image is formed.

<Forming of Former-Stage Color Processing Table>

Then, a method of forming a former-stage color processing table 212 used in the former-stage color signal conversion unit B2 will be explained in detail with reference to FIG. 31. Although the table is used in the explanation of the present embodiment, it is needless to say that a color conversion function equivalent to the table can be used.

The former-stage color processing table 212 is a three-dimensional LUT which is used to perform the color matching between the output devices, i.e., the RGB monitor and the RGB printer, each having different color reproducibility. The method of forming the former-stage color processing table 212 roughly includes the step of converting monitor R, G and B data 205 and printer R, G and B data 231 into data on color space (DIS: device independent space) not pending on the devices, and the step of obtaining the correspondence between the monitor R, G and B data 205 and the printer R, G and B data 231.

Conversion from Monitor R, G and B Data into DIS Data

The monitor R, G and B data 205 are converted into the data on the XYZ color space being the DIS, by calculation using a conversion expression based on a standard such as sRGB or the like. In the present embodiment, chromaticity on CIE L*a*b* color space is obtained further in consideration of human color sense.

Conversion from Printer R, G and B Data into DIS Data

In the present embodiment, it is assumed that the ink-jet printer using six kinds of inks (C, M, Y and K dark inks, and c and m light inks) is used as the printer 105. In the ink-jet printer, it is necessary to perform the color separation in consideration of graininess of printed dots, and a total amount of ink droplets acceptable by a recording medium for a unit time and in a unit area. Thus, in view of these conditions, the latter-stage color processing table 203 which is to be used in the latter-stage color signal conversion unit B3 for color-separating the input R, G and B data and then outputting an appropriate combination of the C, M, Y, K, c and m inks is set beforehand.

Incidentally, if the color process of the printer is controlled through the latter-stage color processing table 203, the printer can be handled as an RGB device which merely processes the R, G and B data irrespective of the printer structure, e.g., a four-color (C, M, Y and K) color printer, or a six-color (C, M, Y, K, c and m) printer.

Moreover, in the ink-jet printer, complicated and wide-ranging factors relate to color generation. For example, the color generation changes due to color mixture of the inks, an ink permeation manner into the recording medium, and the like. Therefore, it is difficult to predict a color generation characteristic of the ink-jet printer. For this reason, in order to eliminate difficulties in predicting the color generation and also representing the color reproducibility of the ink-jet printer, L*a*b* data corresponding to specific printer R, G and B data is obtained as follows. That is, color patches are printed based on a possible combination of the printer R, G and B data and at appropriate sampling intervals, these color patches are measured by a calorimeter such as Gretag Spectrolino measurement instrument or the like, and thus the lattice point data on the printer color reproduction space are obtained. If the L*a*b* values of the lattice point can be obtained, the L*a*b* values (coordinate values of DIS) corresponding to arbitrary printer R, G and B values can be obtained from the L*a*b* values of the lattice point by using known interpolation such as tetrahedron interpolation.

In the embodiment, the latter-stage color processing table 203 of 17×17×17 lattice points (4913 points) of which the sampling intervals of the latter-stage R, G and B signal values are set to 16 and which has the lattice points of the latter-stage R, G and B signal values 0, 16, 32, 48, 64, 80, 96, 112, 128, 144, 160, 176, 192, 208, 224, 240 and 255 is used.

Then, the lattice points are thinned out (corresponding to the sampling interval "32"), and the 9×9×9 lattice points (729 points) corresponding to the lattice points of the latter-stage R, G and B signal values 0, 32, 64, 96, 128, 160, 192, 224 and 255, i.e., the sub-set of the actually used latter-stage color processing table 203, are subjected to the colorimetry, whereby 724 L*a*b* data 204 are obtained.

Gamut Mapping

Next, the gamut mapping to convert monitor L*a*b* data 206 into printer target L*a*b* data 207 will be explained with reference to FIG. 32.

Figure 32:
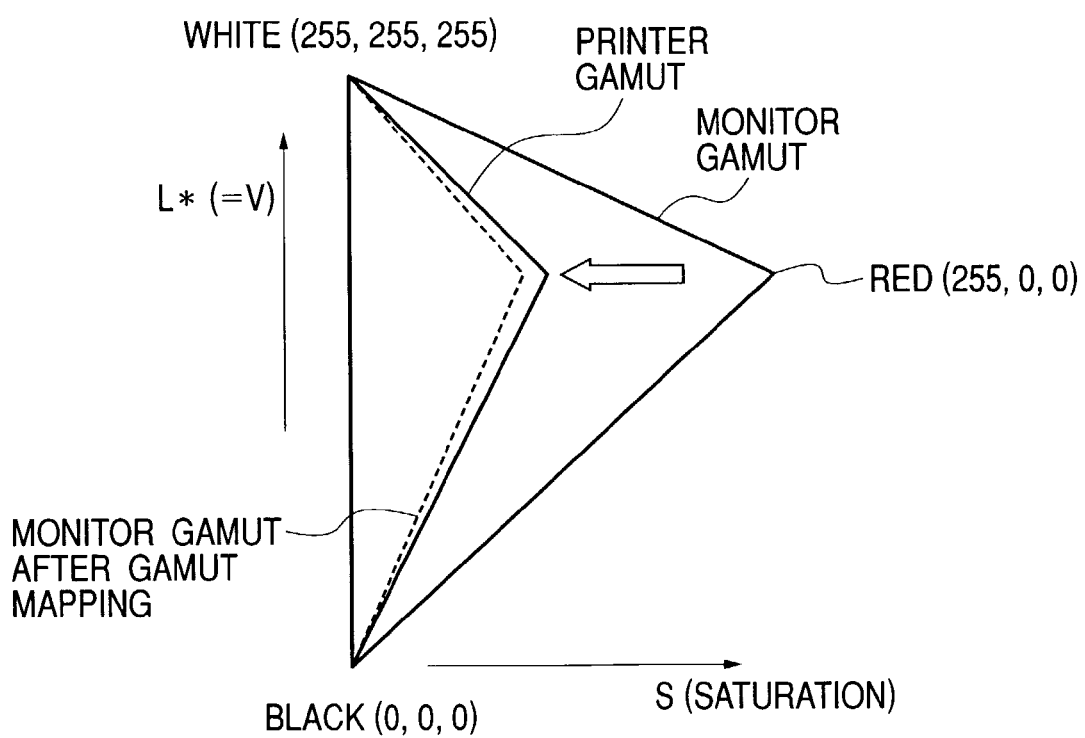
FIG. 32 is a diagram for explaining a notion of gamut compression (gamut mapping) in a saturation direction on a brightness-saturation plane.

On the L*a*b* color space shown in FIG. 32, the gamut (i.e., color reproduction range) of the monitor R, G and B data is wider than the gamut of the printer R, G and B data with respect to both brightness L* and saturation S. Therefore, if only the correspondence between the monitor R, G and B data and the printer R, G and B data on the L*a*b* color space is obtained, all the combinations of R, G and B displayed on the monitor can not be output as appropriate chromaticity by the printer. Thus, although the L*a*b* values of these data can-not be matched, the gamut mapping is performed so that the color similar to the monitor-displayed color can be output by the printer.

Incidentally, the gamut mapping in the embodiment is performed as follows. That is, the gamut of the monitor R, G and B data 205 is changed on the L*a*b* color space, and the printer target L*a*b* data 207 are generated. Then, for example, a process to decrease the saturation $S=\sqrt{(a^{*2}+b^{*2})}$ as maintaining the brightness L* is performed so that the printer target L*a*b* data 207 comes to be within the gamut of the printer R, G and B data, as shown in FIG. 32.

Formation of Former-Stage Color Processing Table

Figure 31:
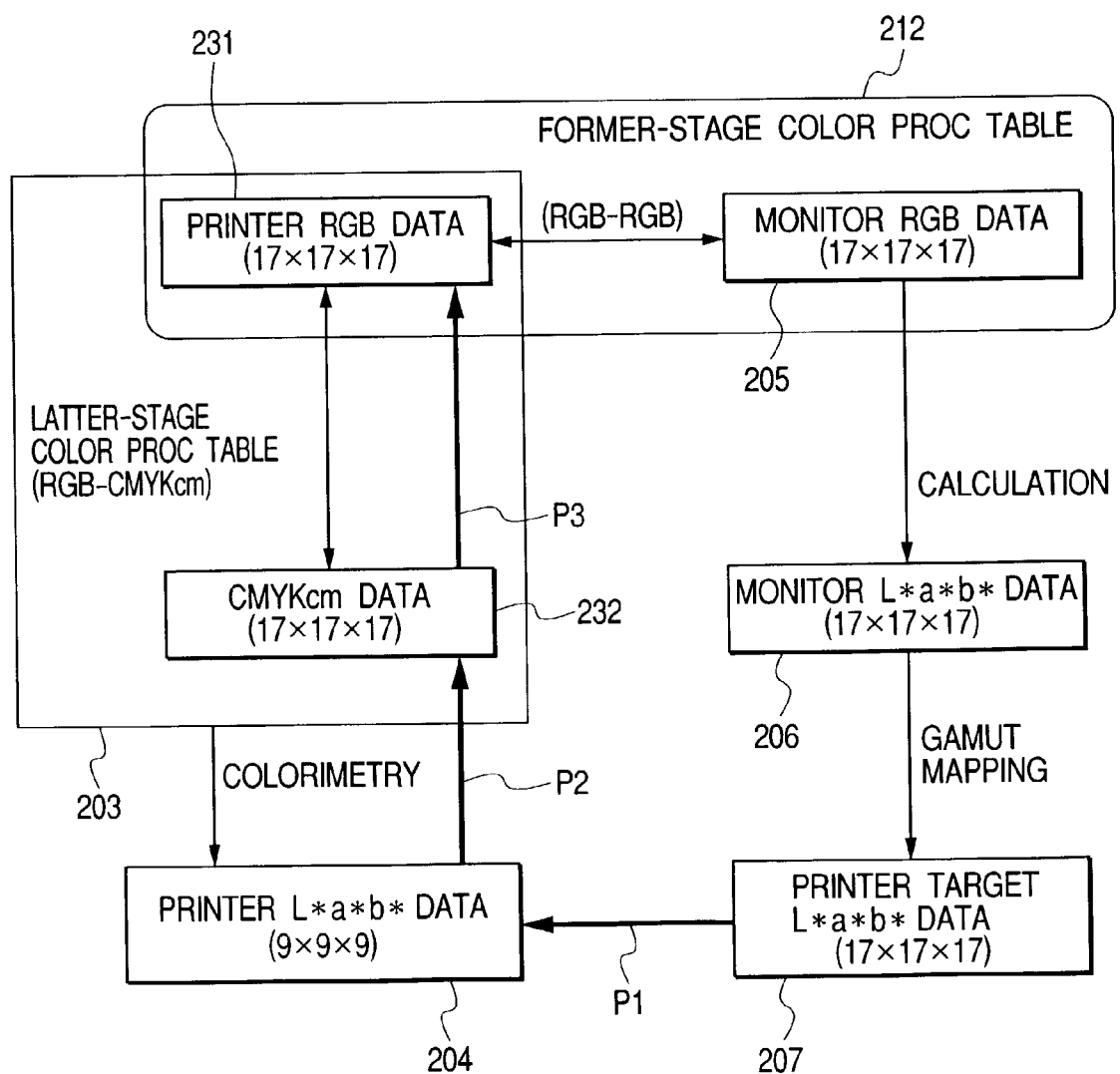
FIG. 31 is a diagram showing a data flow in a process of forming a former-stage LUT performing color matching according to the fifth embodiment.

By the above gamut mapping, the printer target L*a*b* data 207 are adjusted to be within the gamut of the printer R, G and B data, that is, it is possible to set the printer target L*a*b* data 207 to correspond to the printer R, G and B data 231 in processes P1→P2→P3 through the printer L*a*b* data 204 and C, M, Y, K, c and m data 232 shown in FIG. 31.

Then, it is necessary to perform L*a*b*→RGB conversion for each point (L*a*b* values) of the printer target L*a*b* data 207 converted to be within the gamut of the printer R, G and B data. In this case, the R, G and B data are obtained by performing the tetrahedron interpolation using the printer target L*a*b* data 207 being the target of the L*a*b*→RGB conversion and its peripheral points constituting the gamut of the printer R, G and B data, and the points which can not be held within the gamut of the printer R, G and B data are subjected to extrapolation. Incidentally, as the method of performing the L*a*b*→RGB conversion, it is possible to use a conversion method of structuring a printer model using inverse tetrahedron interpolation, neural network or multiple regression.

On one hand, the monitor R, G and B data 205 are set to correspond to the printer target L*a*b* data 207 through the processes concerning the data 205→206→207. Thus, the above two processes, i.e., the calculation and the gamut mapping, are sequentially performed, and the conversions are sequentially performed in the order of the data 205→the data 206→the data 207→the process P1→the data 204→the process P2→the table 203→the data 232→the process P3→the data 231, whereby the former-stage color processing table 212 can be finally obtained.

Hereinafter, the correspondence of the R, G and B signal values, the C, M, Y and K signals values, and the L*a*b* values will be explained in detail with reference to FIG. 33.

Figure 33:
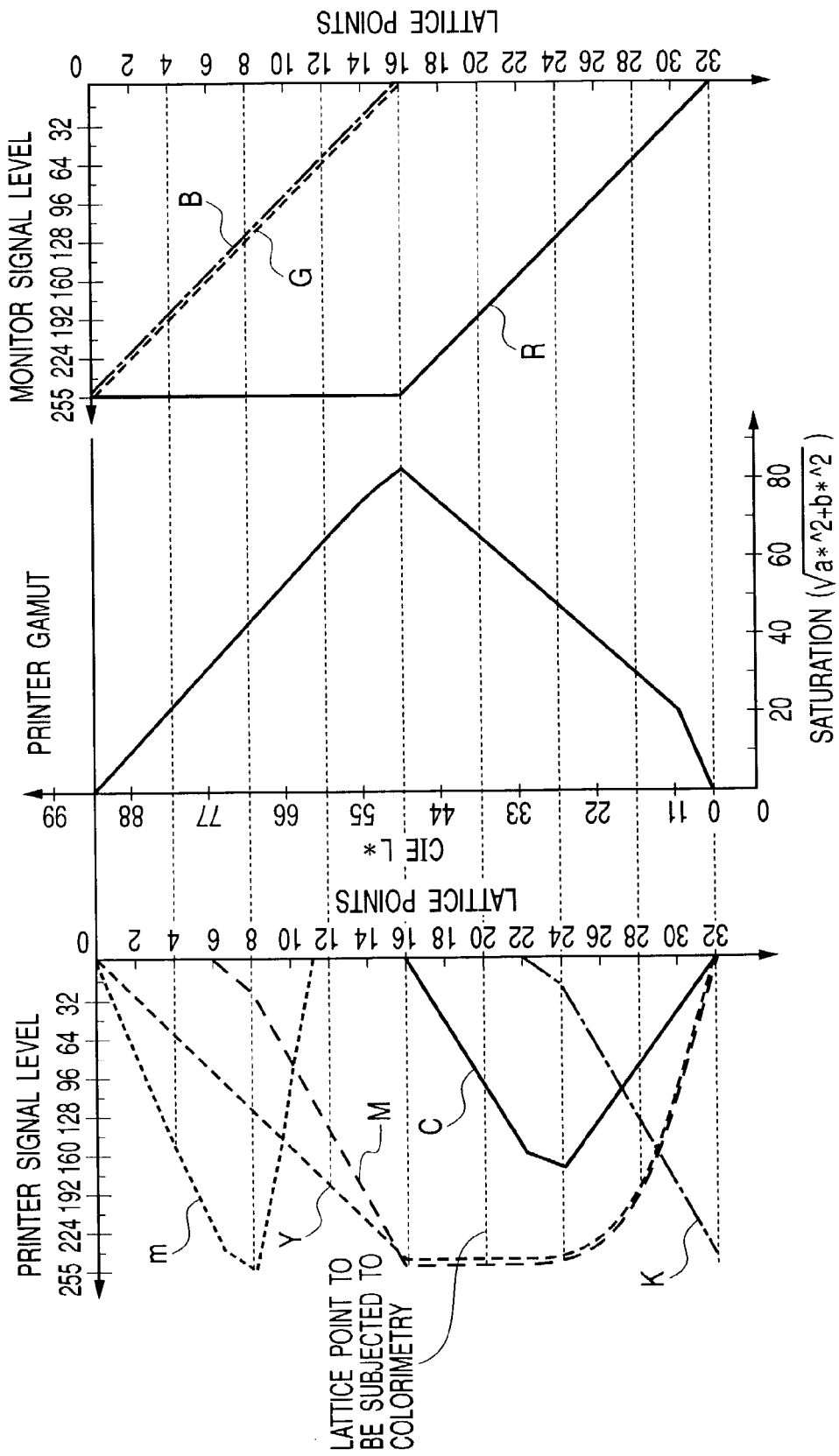
FIG. 33 is a diagram showing the relations of colorimetry points added in the fifth embodiment, a latter-stage LUT (left), a printer gamut (middle), and the former-stage LUT (right)
Figure 34:
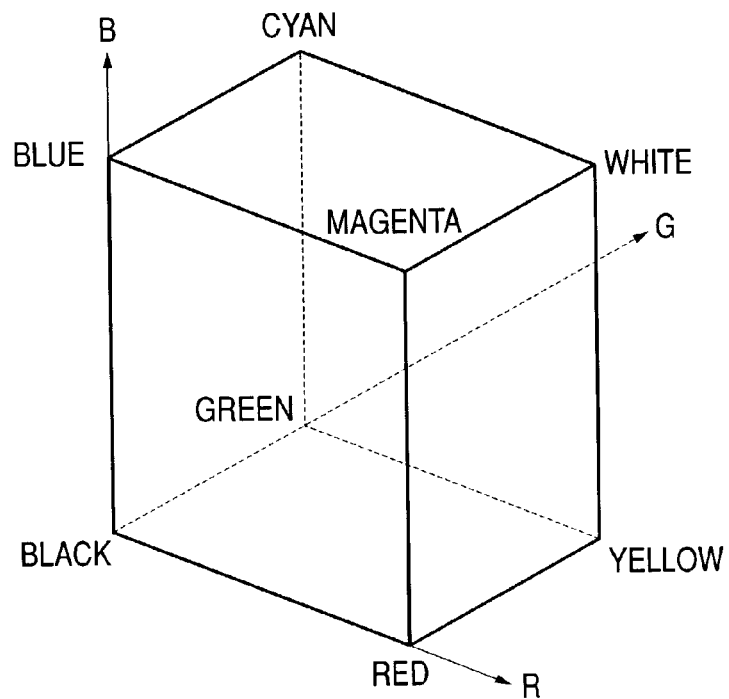
FIG. 34 is a diagram schematically showing lattice points to be colorimetry-processed in the fifth embodiment.

FIG. 33 is the graph schematically showing changes of chromaticity in the axis along white→red→blue of the color solid shown in FIG. 32 corresponding to the color reproduction ranges of the printer and the monitor. Here, it should be noted that the left of FIG. 33 shows the changes of the C, M, Y, K, c and m signals in the RGB printer, the middle of FIG. 33 shows the printer gamut, and the right of FIG. 33 shows the changes of the monitor R, G and B signal values.

For example, in the changes of the printer C, M, Y, K, c and m signals shown in the left of FIG. 33, red of the light area is represented by m and Y, the maximum saturation (central portion) is obtained by M and Y, it becomes gradually dark by adding complementary color C to M and Y, and it finally reaches achromatic color Bk (central portion) by adding K and thus decreasing the M and Y components.

Similarly, in the changes of the monitor R, G and B signals shown in the right of FIG. 33, all of R, G and B become most bright (white) when these signal values are maximum, the brightness decreases when gradually decreasing the G and B signal values, while the saturation by the R signal relatively increases. Further, when the G and B signal values become zero, the saturation becomes maximum at the point where the R signal value is 255, and then both the brightness and the saturation decrease by weakening the R signal itself.

Incidentally, in the case of above "conversion from printer R, G and B data into DIS data", when the printer gamut is structured, the combination of the R, G and B signals sampled with a step width 32 is printed by the printer, whereby the L*a*b* data are obtained. Then, the sampling points of the printer L*a*b* data 202 to be subjected to the colorimetry process are indicated by the horizontal broken lines in FIG. 33.

<Smoothing>

The former-stage color processing table obtained by the processes so far is discontinuous by the influences of the error of the L*a*b* values of the printer color prediction model, the difference of the processing method on the printer gamut boundary and its peripheral portions and the like.

Therefore, according to the present embodiment, smoothing is performed to the formed former-stage color processing table.

Hereinafter, the smoothing method according to the present embodiment will be explained in detail with reference to the attached drawings.

Smoothing Processing Unit

In the smoothing processing unit, it is assumed that the former-stage color processing table 212 (17×17×17 RGB—RGB correspondence table) formed in the above "formation of former-stage color processing table" is stored as an arrangement of LUT_SRC[ ] on the memory. Moreover, it should be noted that an arrangement of LUT_SMOOTH[ ] and an arrangement of LUT_DEST[ ] have the same pattern as that of the arrangement of LUT_SRC[ ], and the arrangement LUT_SRC[ ] and the former-stage color processing table after the smoothing are the outputs of the smoothing processing unit shown in FIG. 36.

Figure 36:
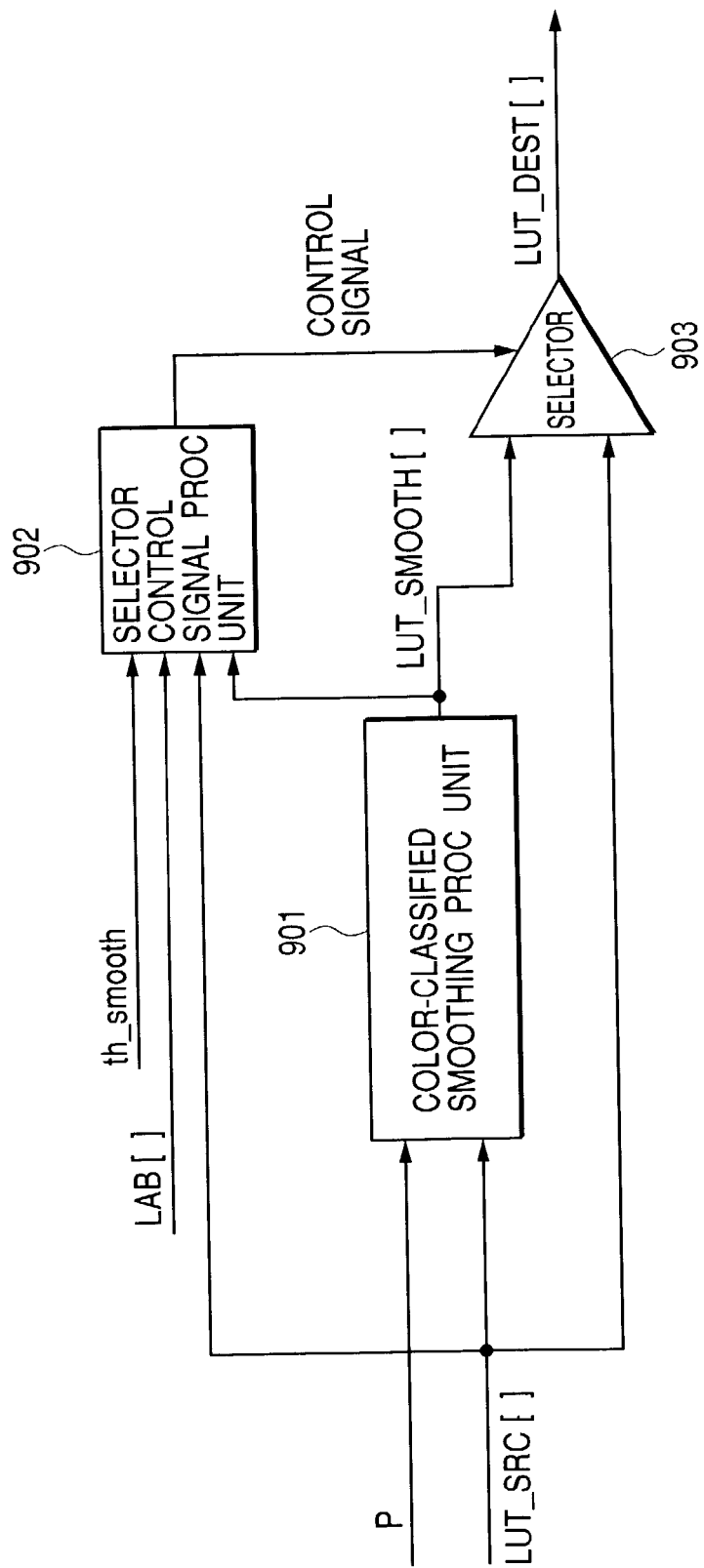
FIG. 36 is a block diagram showing a smoothing processing unit according to the fifth embodiment.

The data input to the smoothing processing unit shown in FIG. 36 is further input to a color-classified smoothing processing unit 901 together with a parameter P indicating the smoothing intensity of each color. Here, it should be noted that the parameter P indicates a vector composed of parameters corresponding to six hues of p_R, p_Y, p_G, p_C, p_B and p_M, where $0 \leq p \leq 1$. Then, the former-stage color processing table LUT_SMOOTH[ ] smoothing-processed for each color by the color-classified smoothing processing unit 901, the former-stage color processing table LUT_SRC[ ] (FIG. 31; 212) before the smoothing process is performed, L*a*b* data LAB[ ] (FIG. 31; 204) at the latter-stage R, G and B lattice points, and a threshold th_smooth representing a variation (change amount) of the L*a*b* values allowed before and after the smoothing is performed are input to a selector control signal processing unit 902. Then, a selector control signal to select the former-stage color processing table LUT_SMOOTH[ ] smoothing-processed for each color if the variation of the L*a*b* values before and after the smoothing is performed is within the allowable range and to select the former-stage color processing table LUT_SRC[ ] (FIG. 31; 212) before the smoothing process is performed if the variation of the L*a*b* values before and after the smoothing is outside the allowable range is output. In response to the selector control signal, a selector 903 selects either the former-stage color processing table LUT_SRC[ ] (212) or the former-stage color processing table LUT_SMOOTH[ ] for each lattice point, and then outputs the selected table as the output table LUT_DEST[ ] of the color-classified smoothing process.

Figure 37:
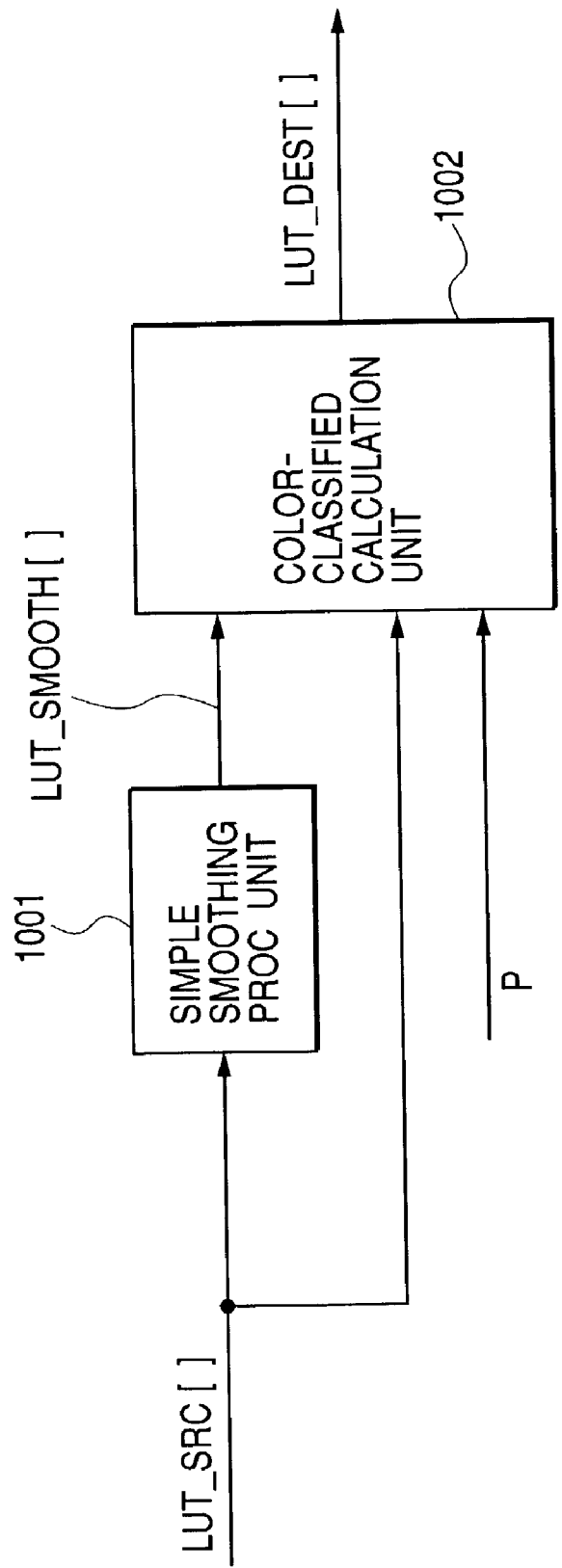
FIG. 37 is a block diagram showing the smoothing processing unit according to the fifth embodiment.

Hereinafter, the color-classified smoothing processing unit 901 of FIG. 36 constituting the part of the above smoothing processing unit will be explained in detail with reference to FIG. 37.

Color-Classified Smoothing Processing Unit

The color-classified smoothing processing unit 901 performs the smoothing of different intensity for each of the six hues of R, Y, G, C, B and M.

That is, the former-stage color processing table LUT_SRC[ ] (212) before the smoothing process is performed and the parameter P indicating the smoothing intensity of each of the six hues of R, Y, G, C, B and M (here, the parameter P is the vector obtained as P=[p ∇R, p_Y, p_G, p_C, p_B, p_M]) are input to the color-classified smoothing processing unit 901, and the output table LUT_DEST[ ] is output as the result of the smoothing for each color.

The input former-stage color processing table LUT_SRC[ ] (212) before the smoothing process is performed is smoothing-processed based on a function expression (1) by a simple smoothing processing unit 1001, and then output as the former-stage color processing table LUT_SMOOTH[ ]:

$$LUT\_SMOOTH[17 \cdot (17 \cdot k + j) + i] = \qquad (1)$$

-continued $$\frac{1}{27}\sum_{l=1}^{1}\sum_{m=1}^{1}\sum_{n=1}^{1}\text{LUT\_SRC}[17\cdot\{17\cdot(k+l)+(j+m)\}+(i+n)]$$

where it is assumed that each of k, j and i has the value equal to or larger than 1 and equal to or smaller than (17−1).

Figures 39, 40:
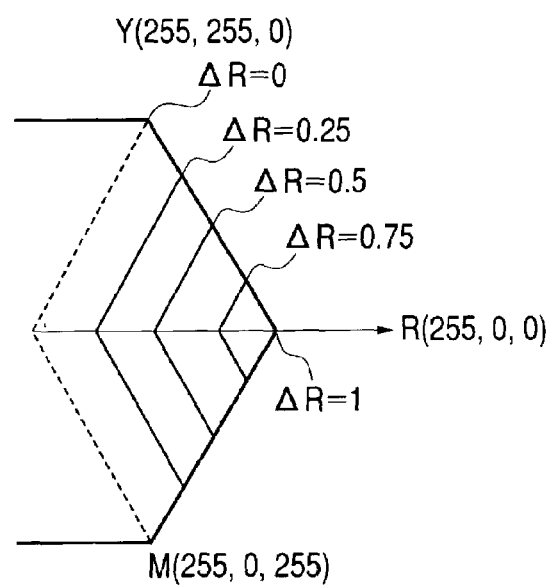
FIG. 39 is a diagram showing the values obtained in a smoothing process.
FIG. 40 is a diagram showing the values obtained in the smoothing process.

Then, values ΔR, ΔY, ΔG, ΔC, ΔB and ΔM shown in FIG. 39 are obtained by using the former-stage color processing table LUT_SMOOTH[ ] after the smoothing is performed which table is output from the simple smoothing processing unit 1001. Then, in a color-classified calculation unit 1002, the smoothing result for each color is obtained based on an expression (2), by using the above values and the input smoothing intensity P for each color:

$$\begin{bmatrix} R' \\ G' \\ B' \end{bmatrix} = \begin{bmatrix} R + (Rsm - R) \cdot (p\_R \cdot \Delta R + p\_Y \cdot \Delta Y + p\_G \cdot \Delta G + p\_C \cdot \Delta C + p\_B \cdot \Delta B + p\_M \cdot \Delta M) \\ G + (Gsm - G) \cdot (p\_R \cdot \Delta R + p\_Y \cdot \Delta Y + p\_G \cdot \Delta G + p\_C \cdot \Delta C + p\_B \cdot \Delta B + p\_M \cdot \Delta M) \\ B + (Bsm - B) \cdot (p\_R \cdot \Delta R + p\_Y \cdot \Delta Y + p\_G \cdot \Delta G + p\_C \cdot \Delta C + p\_B \cdot \Delta B + p\_M \cdot \Delta M) \end{bmatrix} \quad (2)$$

Here, the symbol R', G' and B' respectively denote the R, G and B components at a certain lattice point on the arrangement LUT_DEST[ ] including the vectors as the components, the symbol R, G and B respectively denote the R, G and B components at a certain lattice point on the arrangement LUT_SRC[ ] including the vectors as the components, and the symbols Rsm, Gsm and Bsm respectively denote the R, G and B components at a certain lattice point on the arrangement LUT_SMOOTH[ ] including the vectors as the components.

Figure 35:
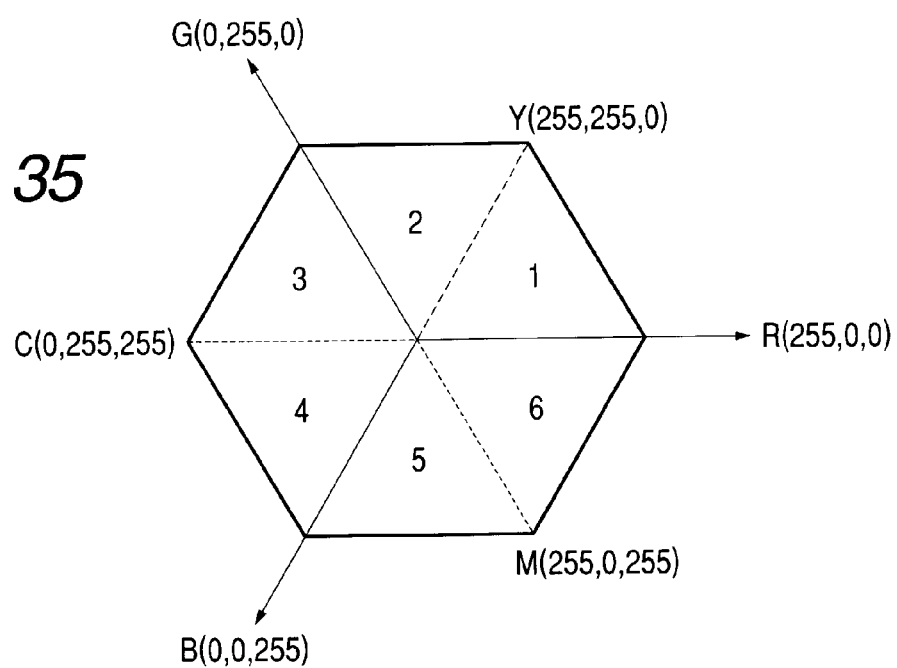
FIG. 35 is a diagram showing six areas determined by RGB relations.

Moreover, the symbols ΔR, ΔY, ΔG, ΔC, ΔB and ΔM respectively denote the values which are determined according to the magnitude relation of the respective R, G and B values and obtained as shown in FIG. 39 respectively in the six areas shown in FIG. 35. For example, with respect to a color of a red system, the value ΔR becomes continuously smaller as the distance from the R-axis becomes larger as shown in FIG. 40. Moreover, it is set that the value ΔR becomes zero on the Y-axis and the M-axis adjacent to the R-axis. As a result, it is possible to perform the smoothing control so that the smoothing is locally performed or locally not performed, and, it is moreover possible to prevent a color discontinuously changing. Besides, it is possible to make reproducibility in the vicinity of the solid portion excellent.

The above smoothing result is output as the table LUT_DEST[ ] from the color-classified smoothing processing unit.

In the present embodiment, the example of simply averaging the values of the peripheral lattice points and the target (attention) lattice point on three-dimensional space is explained as the smoothing method. However, of course, the same effect as above can be obtained even if another smoothing method is used.

Figure 38:
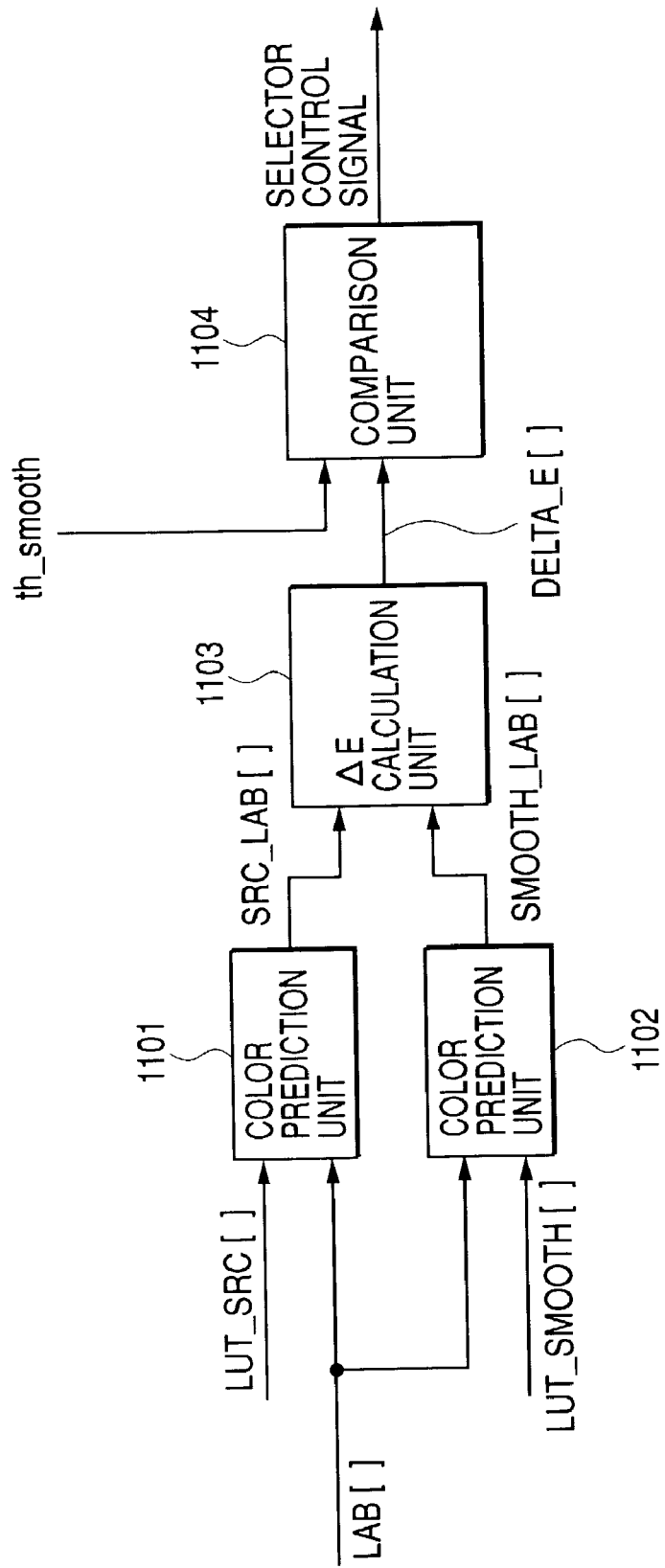
FIG. 38 is a block diagram showing a part of the smoothing processing unit according to the fifth embodiment.

Hereinafter, the selector control signal processing unit 902 constituting the part of the above smoothing processing unit will be explained in detail with reference to FIG. 38.

Selector Control Signal Processing Unit

The former-stage color processing table LUT_SRC[ ] (212) before the smoothing process is performed, the former-stage color processing table LUT_SMOOTH[ ] after the smoothing for each color is performed, the latter-stage colorimetry data table LAB[ ] (204) are input to the selector control signal processing unit 902, and then the selector control signal to allow the smoothing when the color change (color difference=ΔE) is within the reference value before and after the smoothing is performed is output.

Then, the former-stage color processing table LUT_SRC[ ] (212) and the former-stage color processing table LUT_SMOOTH[ ] are input to color prediction units 1101 and 1102 respectively together with the latter-stage colorimetry data table LAB[ ] (204), and the input data is subjected to tetrahedron interpolation by using the latter-stage colorimetry data table LAB[ ] (204) and thus converted into the L*a*b* values. The obtained L*a*b* values are stored in tables SRC LAB[ ] and SMOOTH LAB[ ], respectively.

The tables SRC LAB[ ] and SMOOTH LAB[ ] being the obtained L*a*b* values respectively corresponding to the former-stage color processing table LUT_SRC[ ] (212) and the former-stage color processing table LUT_SMOOTH[ ], are input to a ΔE calculation unit 1103, and the value ΔE (color difference) before and after the smoothing is performed at the corresponding lattice point is obtained and then stored in a color difference table delta e[ ] in a comparison unit 1104.

In the comparison unit 1104, a maximum allowable value th_smooth of the value ΔE is compared with the color difference table delta e[ ] of each lattice point, and a selector control signal to select the former-stage color processing table LUT_SMOOTH[ ] if the change of the value ΔE before and after the smoothing is performed is within the allowable range and to select the former-stage color processing table LUT_SRC[ ] if the change of the value ΔE is outside is outside the allowable range is output by the selector 903. By such a structure, it is possible to perform the smoothing of noises as controlling the color change.

Next, the latter-stage color signal conversion unit B3 shown in FIG. 30 will be explained. Here, it should be noted that, hereinafter, the latter-stage color conversion of three-color system or four-color system will be described to simplify the explanation.

In the latter-stage color signal conversion unit B3 shown in FIG. 30, the printer R, G and B signals obtained from the former-stage color signal conversion unit B2 are converted into the C, M, Y and K eight-bit color signal values corresponding to the inks used in the printer. It should be noted that the conversion from the printer R, G and B signals into the C, M, Y and K signal values is performed by using, e.g., a conventionally known color masking method, in accordance with expressions (3) and (4):

$$Dr = -\log(R/255)$$

$$Dg = -\log(G/255)$$

$$Db = -\log(B/255) \quad (3)$$

$$\begin{bmatrix} C \\ M \\ Y \end{bmatrix} = \begin{bmatrix} 1 & mr & yr \\ cg & 1 & yg \\ cb & mb & 1 \end{bmatrix}^{-1} \begin{bmatrix} Dr \\ Dg \\ Dg \end{bmatrix} \quad (4)$$

Incidentally, there are various methods to select the signal value of K. For example, it is possible to use a method of replacing a vector [D_r-K D_g-K D_b-K]^t (obtained by subtracting the signal value of K from the respective vector components of the rightmost side of the expression (3)) with the respective vector components of the rightmost side thereof, obtaining a masking matrix by trial and error as controlling the signal value of K by using the condition that the C, M and Y signal values corresponding to the ink amount are always positive or zero, and thus determining the signal value of K.

According to the present embodiment, the latter-stage color signal conversion table is formed by using the above method, and the formed table is fine-adjusted manually according to need, whereby the latter-stage color signal conversion table is finally determined.

Next, the gradation correction unit B4 shown in FIG. 30 will be explained.

In the gradation correction unit B4 shown in FIG. 30, the C, M, Y and K eight-bit data sequentially converted from the input image signals by the former-stage and latter-stage conversion units are further converted into C, M, Y and K two-bit data capable of being printed by the printer. In such a gradation correction process, for example, a Bayer-type 16×16 matrix is applied to each of the C, M, Y and K image data. Then, 1 is set if the pixel value of the corresponding image is larger than the element of the matrix, while 0 is set if the pixel value of the corresponding image is equal to or smaller than the element of the matrix. Incidentally, an error diffusion method or the like may be used as such a halftone process.

For example, an interpolation method such as cubic interpolation or the like may be used instead of the interpolation disclosed in Japanese Patent Application Laid-Open No. 3-13066 and used in the present embodiment.

It should be noted that, although several kinds of methods have been conventionally known as color reproduction space mapping technique, the present embodiment is not limited to them.

Modification of Fifth Embodiment

Modification of Control Signal Calculation Method of Selector Control Signal Processing Unit In the fifth embodiment, when the selector control signal is set, the variation (change amount) before and after the smoothing is performed is provided on the basis of the color prediction values (L*a*b*) before and after the smoothing.

However, the variation before and after the smoothing is performed may be provided by using the R, G and B signal values, e.g., $\Delta E = \sqrt{(Rsrc-Rsm)^2 + (Gsrc-Gsm)^2 + (Bsrc-Bsm)^2}$ or the like. In this case, the color prediction units 1101 and 1102 and the latter-stage colorimetry data table LAB[ ] shown in FIG. 36 are unnecessary, the table LUT_SRC[ ] is used instead of the table SRC LAB[ ], and the table LUT_SMOOTH[ ] is used instead of the table SMOOTH LAB [ ], whereby it is possible to simplify the system structure as a whole and thus reduce the used memory amount.

Besides, a hue difference $\Delta$HUE, a saturation difference $\Delta$C, a brightness difference $\Delta$L or the like may be used instead of the color difference $\Delta$E.

Modification of Simple Smoothing Processing Unit 1001

In the fifth embodiment, the smoothing process by the simple smoothing processing unit 1001 is performed one time. However, by applying a fixed or variable parameter n, the smoothing process can be performed n times. By doing so, the smoothing can be more effectively performed. In this case, the result of the (n−1)th-time smoothing is recursively input to the simple smoothing processing unit 1001 shown in FIG. 37.

Modification of Color-Classified Calculation Unit 1002

In the fifth embodiment, the process by the color-classified calculation unit 1002 is performed for each of the classified six hues of R, Y, G, C, B and M. However, such a process may be performed for each of classified brightness directions by using an expression L={max(r_, max(g_, b_)+min(r_, min(g_, b_))}/2 or the like.

Similarly, in the process by the color-classified calculation unit 1002, it is possible to perform the smoothing based on the specific color by setting the smoothing intensity at each lattice point with use of a spherical potential such as V(r-r')=exp(−α·(r-r'))/(r-r').

Moreover, to set the smoothing intensity at each lattice point, it is thought to use a three-dimensional look-up table where the smoothing intensities at the respective lattice points have been stored.

How to Set Parameter

The parameters such as the smoothing intensity, the allowable (permissible) values of the changes before and after the smoothing, the number of times of the smoothing, and the like may be set as fixed values or input by the user from a GUI (graphical user interface) provided separately.

In the case of inputting the parameters, in order to enable the user to set the parameters as confirming the smoothing effects, it is also effective to provide a preview screen for displaying graphs of the R, G and B signal values and the L*a*b* values, and displaying both the sample images processed by the look-up table before the smoothing and the sample images processed by the look-up table after the smoothing. Of course, if both the sample images processed by the look-up table before the smoothing and the sample images processed by the look-up table after the smoothing are simultaneously displayed on the screen, the user can more easily confirm the smoothing effects.

In addition, the above embodiments may be appropriately combined with others.

As explained above, it is possible to selectively perform the smoothing only to the noise of the specific color in the chromatic color being the target of the smoothing as maintaining the peak portions of the color signal changes before and after the smoothing.

The present invention is applicable to a system composed of plural apparatuses (e.g., a host computer, an interface apparatus, a reader, a printer, and the like) or to a single apparatus (e.g., a copying machine, a facsimile apparatus or the like).

Moreover, it is needless to say that the object of the present invention can be achieved in a case where a storage medium storing the program codes of software to realize the functions of the above embodiments is supplied to a system or an apparatus and then a computer (or CPU or MPU) in the system or the apparatus reads and executes the program codes stored in the storage medium.

In this case, the program codes themselves read from the storage medium realize the functions of the above embodiments, whereby the storage medium storing these program codes constitutes the present invention.

As the storage medium for supplying the program codes, for example, a floppy disk, a hard disk, an optical disk, a magnetooptical disk, a CD-ROM, a CD-R, a magnetic tape, a nonvolatile memory card, a ROM or the like can be used.

Moreover, it is needless to say that the present invention includes not only a case where the functions of the above embodiments are realized by executing the program codes read by the computer, but also a case where an OS (operating system) or the like functioning on the computer executes a part or all of the actual process according to the instructions of the program codes, whereby the functions of the above embodiments are achieved by that process.

Moreover, it is needless to say that the present invention includes a case where the program codes read from the storage medium are once written in a memory provided in a function expansion board inserted in the computer or a function expansion unit connected to the computer, and then a CPU or the like provided in the function expansion board or the function expansion unit executes a part or all of the actual process according to the instructions of the program codes, whereby the functions of the above embodiments are achieved by that process.

What is claimed is:

1. A color correction table forming method of forming a color correction table by performing smoothing, comprising the steps of:
    setting smoothing conditions respectively corresponding to plural positions on color space; and
    performing the smoothing according to the smoothing conditions,
    wherein the plural positions are lattice points on the color space,
    wherein the smoothing conditions for the lattice points of the color correction table are obtained on the basis of the smoothing conditions corresponding to plural representative colors,
    wherein the smoothing condition for each lattice point is a limiting value of a color variation before and after the smoothing, and
    wherein, in a case of setting the smoothing conditions for the lattice points, the limiting values of the lattice points existing between white and each of the plural representative colors and between each of the plural representative colors and black are determined on the basis of the smoothing conditions for the lattice points of the color correction table, the limiting values of the lattice points existing on hue faces of the white, the black and the plural representative colors are determined on the basis of the smoothing conditions for the lattice points of the color correction table, and the limiting value of the lattice point existing between the adjacent two hue faces is determined on the basis of said determined limiting values.

2. A color correction table forming method according to claim 1, wherein the smoothing conditions are color variations before and after the smoothing at the plural positions on the color space.

3. A color correction table forming method according to claim 2, wherein the color variation is a color difference.

4. A color correction table forming method according to claim 2, wherein the color variation is obtained on the basis of colorimetry values before and after the smoothing.

5. A color correction table forming method according to claim 1, wherein the plural positions on the color space are the positions corresponding to plural representative colors.

6. A color correction table forming method according to claim 5, wherein input values to the color correction table are R (red), G (green) and B (blue) values, and the representative colors are red, green, blue, cyan, magenta and yellow.

7. A color correction table forming method according to claim 1, wherein the smoothing is not performed at a lattice point on an achromatic color axis of the color correction table.

8. A color correction table forming method according to claim 1, wherein the limiting value linearly or nonlinearly changes according to a distance or an angle from the lattice point.

9. A color correction table forming method according to claim 1, wherein an image after the smoothing is performed is displayed on a preview screen formation unit for forming a preview screen displaying the result of the smoothing.

10. A color correction table forming method according to claim 1, wherein the plural positions are determined on the basis of an author's instruction.

11. A color correction table forming method according to claim 1, wherein an influential range of the smoothing is determined on the basis of an author's instruction.

12. A color correction table forming apparatus for forming a color correction table by performing smoothing, comprising:
    means for setting smoothing conditions respectively corresponding to plural positions on color space; and
    means for performing the smoothing according to the smoothing conditions,
    wherein the plural positions are lattice points on the color space,
    wherein the smoothing conditions for the lattice points of the color correction table are obtained on the basis of the smoothing conditions corresponding to plural representative colors,
    wherein the smoothing condition for each lattice point is a limiting value of a color variation before and after the smoothing, and
    wherein, in a case of setting the smoothing conditions for the lattice points, the limiting values of the lattice points existing between white and each of the plural representative colors and between each of the plural representative colors and black are determined on the basis of the smoothing conditions for the lattice points of the color correction table, the limiting values of the lattice points existing on hue faces of the white, the black and the plural representative colors are determined on the basis of the smoothing conditions for the lattice points of the color correction table, and the limiting value of the lattice point existing between the adjacent two hue faces is determined on the basis of said determined limiting values.

13. A computer program, stored in executable form in a computer-readable storage medium, used to form a color correction table by performing smoothing, said computer program comprising:
    a code of setting smoothing conditions respectively corresponding to plural positions on color space; and
    a code of performing the smoothing according to the smoothing conditions, wherein the plural positions are lattice points on the color space, wherein the smoothing conditions for the lattice points of the color correction table are obtained on the basis of the smoothing conditions corresponding to plural representative colors, wherein the smoothing condition for each lattice point is a limiting value of a color variation before and after the smoothing, and wherein, in a case of setting the smoothing conditions for the lattice points, the limiting values of the lattice points existing between white and each of the plural representative colors and between each of the plural representative colors and black are determined on the basis of the smoothing conditions for the lattice points of the color correction table, the limiting values of the lattice points existing on hue faces of the white, the black and the plural representative colors are determined on the basis of the smoothing conditions for the lattice points of the color correction table, and the limiting value of the lattice point existing between the adjacent two hue faces is determined on the basis of said determined limiting values.

14. A computer-readable storage medium which stores a computer program used to form a color correction table by performing smoothing, said computer program comprising:

code means for setting smoothing conditions respectively corresponding to plural positions on color space; and code means for performing the smoothing according to the smoothing conditions, wherein the plural positions are lattice points on the color space, wherein the smoothing conditions for the lattice points of the color correction table are obtained on the basis of the smoothing conditions corresponding to plural representative colors, wherein the smoothing condition for each lattice point is a limiting value of a color variation before and after the smoothing, and wherein, in a case of setting the smoothing conditions for the lattice points, the limiting values of the lattice points existing between white and each of the plural representative colors and between each of the plural representative colors and black are determined on the basis of the smoothing conditions for the lattice points of the color correction table, the limiting values of the lattice points existing on hue faces of the white, the black and the plural representative colors are determined on the basis of the smoothing conditions for the lattice points of the color correction table, and the limiting value of the lattice point existing between the adjacent two hue faces is determined on the basis of said determined limiting values.

\* \* \* \* \*